United States Patent
Nishimoto et al.

(10) Patent No.: US 6,871,024 B2
(45) Date of Patent: Mar. 22, 2005

(54) DISPERSION COMPENSATING METHOD, DISPERSION COMPENSATING APPARATUS AND OPTICAL TRANSMISSION SYSTEM

(75) Inventors: Hiroshi Nishimoto, Kawasaki (JP); Satoshi Mikami, Sendai (JP)

(73) Assignee: Fujitsu Limited, Kawasaki (JP)

( * ) Notice: Subject to any disclaimer, the term of this patent is extended or adjusted under 35 U.S.C. 154(b) by 641 days.

(21) Appl. No.: 09/866,646

(22) Filed: May 30, 2001

(65) Prior Publication Data

US 2002/0089724 A1 Jul. 11, 2002

(30) Foreign Application Priority Data

Jan. 10, 2001 (JP) ........................................ 2001-002174

(51) Int. Cl.⁷ ............................ H04B 10/18; H04J 14/02
(52) U.S. Cl. ........................ 398/159; 398/81; 398/149; 398/147
(58) Field of Search ................................. 398/158, 141, 398/81, 147, 149, 159, 209

(56) References Cited

U.S. PATENT DOCUMENTS

| | | | | |
|---|---|---|---|---|
| 5,608,562 A | * | 3/1997 | Delavaux et al. | 398/148 |
| 5,717,510 A | | 2/1998 | Ishikawa et al. | 359/161 |
| 5,877,879 A | | 3/1999 | Naito | 359/133 |
| 5,969,865 A | | 10/1999 | Shirasaki | 359/577 |
| 5,982,963 A | * | 11/1999 | Feng et al. | 385/37 |
| 6,229,631 B1 | | 5/2001 | Sato et al. | 359/110 |
| 6,370,300 B1 | | 4/2002 | Eggleton et al. | 385/37 |
| 6,654,564 B1 | * | 11/2003 | Colbourne et al. | 398/147 |
| 2003/0163771 A1 | * | 8/2003 | Tomofuji | 714/48 |

FOREIGN PATENT DOCUMENTS

| | | |
|---|---|---|
| EP | 0700178 A2 | 3/1996 |
| EP | 0902558 A2 | 3/1999 |
| EP | 0944191 A1 | 9/1999 |
| JP | 7-221705 | 8/1995 |
| JP | 7-231297 | 8/1995 |
| JP | 9-326755 | 12/1997 |
| JP | 10-276172 | 10/1998 |

OTHER PUBLICATIONS

Ishikawa, et al. "Demonstration of Automatic Dispersion Equalization in 40 Gbit/s OTDM Transmission." ECOC'98 Sep. 20–24, 1998. pp. 519–520.

Akiyama, et al. "Automatic Dispersion Equalization in 40 Gbit/s Transmission by Seamless Switching Between Multiple Signal Wavelengths." ECOC'99, Sep. 26–30, 1999. pp. 150–151.

Ohn, et al. "Tunable Fiber Grating Dispersion Using a Piezoelectric Stack." OFC'97 Technical Digest. pp. 155–156.

M. Shirasaki "Dispersion Compensation Using the Virtually Imaged Phased Array." APCC/OFCC'99. pp. 1367–1370.

(List continued on next page.)

Primary Examiner—Leslie Pascal
(74) Attorney, Agent, or Firm—Staas & Halsey LLP

(57) ABSTRACT

The present invention aims at realizing a dispersion compensating method capable of readily conducting automatic compensation of waveform degradation caused by dispersion characteristics of an optical transmission path, and at providing a dispersion compensating apparatus and an optical transmission system, of a smaller size at a reduced cost. To this end, the dispersion compensating apparatus of the present invention comprises: a variable dispersion compensator for compensating for the dispersion of optical signal input via an optical transmission path; a bit error information monitoring circuit for generating bit error information of a received signal output from the variable dispersion compensator via an optical receiving circuit; and a controlling circuit for optimally controlling a wavelength dispersion value of the variable dispersion compensator based on the bit error information from the bit error information monitoring circuit.

42 Claims, 20 Drawing Sheets

OTHER PUBLICATIONS

Hiroki Ooi, et al. "Automatic Polarization–mode dispersion Compensation in 40 Gbit/s Transmission." OFC/IOOC'99, Feb. 21–26, 1999, San Diego. pp. 86–88.

Henning Bulow. "Equalization of Bit Distortion Induced by Polarization Mode Dispersion." IOS Press, 1997. pp. 65–72.

G. Fisher, et al. "Automatic Polarization Mode Dispersion Compensation in 40 Gbit/s Optical Transmission System." Electronics Letters, Nov. 12, 1998, vol. 34, No. 23. pp. 2258–2259.

\* cited by examiner

AT INITIAL SETTING

IN OPERATION

DISPERSION COMPENSATING METHOD, DISPERSION COMPENSATING APPARATUS AND OPTICAL TRANSMISSION SYSTEM

BACKGROUND OF THE INVENTION (1) Field of the Invention

The present invention relates to a dispersion compensating technique suitable for a long distance optical transmission system having a large capacity, and particularly to a dispersion compensating method, dispersion compensating apparatus and optical transmission system, which are capable of readily realizing automatic compensation of wavelength dispersion and polarization mode dispersion.

(2) Related Art

Recently, there has been increased transmission speed of optical transmission apparatus such that an optical transmission apparatus of 10 Gb/s has been already practiced and an optical transmission system of 40 Gb/s is being developed. With the increased transmission speed, optical signal waveforms are considerably deteriorated due to wavelength dispersion characteristics of optical fibers and due to polarization mode dispersion characteristics of optical fibers and optical circuits, thereby resulting in a main factor which restricts a transmission distance.

For example, an optical transmission system of 10 Gb/s adopts a dispersion compensation fiber for compensating for wavelength dispersion to thereby allow a long distance transmission over several hundreds of kilometers. In transmitting optical signals at 10 Gb/s over several hundreds of kilometers in such a way, an influence by polarization mode dispersion is less, so that the necessity of polarization mode dispersion compensation is less. Contrary, in transmitting optical signals at 40 Gb/s over several hundreds of kilometers, there can not be neglected: changes in wavelength dispersion characteristics due to temperature changes of optical fiber; and the influence by polarization mode dispersion, thereby requiring a system for automatically compensating for wavelength dispersion and polarization mode dispersion.

As conventional techniques for automatically compensating for wavelength dispersion and polarization mode dispersion, there has been proposed an apparatus comprising separately: a circuit for automatically compensating for wavelength dispersion of optical signals transmitted through an optical transmission path; and another circuit for automatically compensating for polarization mode dispersion of the optical signals; in which a dispersion compensator of each of the circuits comprises a variable dispersion compensating device, a controlling monitor circuit, and a controlling circuit; such as described in Japanese Unexamined Patent Publication No. 7-221705.

Further, as specific conventional techniques concerning wavelength dispersion compensation, there have been known various techniques such as described in: Japanese Unexamined Patent Publication Nos. 8-321805, 9-326755, and 10-276172; the article by G. Ishikawa et al., "DEMONSTRATION OF AUTOMATIC DISPERSION EQUALIZATION IN 40 Gbit/s OTDM TRANSMISSION", Technical Digest of ECOC'98, pp. 519–520, 1998; the article by Y. Akiyama et al, "AUTOMATIC DISPERSION EQUALIZATION IN 40 Gbit/s TRANSMISSION BY SEAMLESS-SWITCHING BETWEEN MULTIPLE SIGNAL WAVELENGTHS"; Technical Digest of ECOC '99, pp. 1-150–151, 1999. Further, as variable wavelength dispersion compensating devices to be used for wavelength dispersion compensation, there have been known: a VIPA (Virtually-Imaged-Phased-Array) device such as described in the article by M. Shirasaki et al., "Dispersion Compensation Using The Virtually Imaged Phased Array", APCC/OECC", '99, pp. 1367–1370, 1999; and an optical device utilizing a FBG (Fiber-Bragg-Grating) reported in the article by M. M. Ohn et al., "Tunable Fiber Grating Dispersion Using a Piezoelectric Stack", OFC'97, WJ3.

Further, specific conventional techniques concerning polarization mode dispersion compensation are generally classified into an optical processing type, a photoelectric processing type, and an electric processing type, such as described in the article by H. Bulow et al., "Equalization of Bit Distortion Induced by Polarization Mode Dispersion", Technical Digest of Core and ATM Networks NOC '97, pp. 65–72. Concerning the optical processing type, a multi-staged type is also studied. Both of the optical processing type and the photoelectric processing type require a control of polarization state. Moreover, all of the three processing types require a control of a plurality of controlling terminals. Further, as a controlling method for polarization mode dispersion compensation, there is also known a technique such as described in the article by H. Ooi et al., "Automatic Polarization Mode Dispersion Compensation in 40 Gbit/s Transmission", IOOC '99, WE5; and the article by D. Sandel et al., "Automatic polarization mode dispersion compensation in 40 Gbit/s optical transmission system", Electron. Lett., 1998 pp. 2258–2259, which propose a method to control a polarization state by monitoring frequency components being ½ or ¼ of a clock signal included in optical signals after polarization mode dispersion compensation.

However, the aforementioned conventional dispersion compensating techniques involve the following problems:

(1) Although most of the conventional dispersion compensating techniques require a control of polarization state, the polarization state rapidly fluctuates such as due to vibration of optical fibers. This requires rapid polarization control such as on the order of $\frac{1}{1000}$ seconds.

(2) The controlling algorithm for the plurality of controlling terminals in the conventional polarization mode dispersion compensation is so complicated, particularly in the multi-staged type. Thus, it is difficult to realize such a controlling algorithm simultaneously with the rapid control in the item (1).

(3) Polarization mode dispersion is a complicated phenomenon where optical signal waveforms are distorted, due to closely related phenomena such as: a distribution in the longitudinal direction of main axes of polarization of an optical fiber; variance of a polarization mode dispersion in the longitudinal direction of the optical fiber; fluctuation of polarization of signal light; and polarization mode dispersions in higher orders. Thus, it is difficult to fully compensate for polarization mode dispersion, by those various compensating techniques proposed so far.

(4) Concerning a constitution for separately conducting automatic compensation of wavelength dispersion and automatic compensation of polarization mode dispersion, there has not been yet established a controlling technique for dividing the compensation control of wavelength dispersion and the compensation control of polarization mode dispersion, to realize simultaneously both of the controls.

(5) The automatic compensation of wavelength dispersion and that of polarization mode dispersion are separately conducted, resulting in an increased size of apparatus and an increased cost.

(6) As a monitoring circuit for controlling a variable dispersion compensating device, there are required such as: a circuit for branching output light; a high frequency circuit for monitoring a frequency component, waveform degradation or the like; and a circuit for monitoring a polarization state; which results in an increased size of the monitoring circuit and an increased cost.

(7) The conventional monitoring circuit for wavelength dispersion compensation control is a circuit to monitor a clock signal component included in output light, to conduct a control, relying upon such as a bit rate of an optical signal, a signal format such as NRZ or RZ, and wavelength chirping. Thus, it is difficult to correspond to so-called bit rate free and/or format free systems.

SUMMARY OF THE INVENTION

The present invention has been carried out in view of the conventional problems as described above, and it is therefore an object of the present invention to realize a dispersion compensating method capable of readily conducting automatic compensation of waveform degradation caused by dispersion characteristics of an optical transmission path, to thereby provide a dispersion compensating apparatus of reduced sizes at a reduced cost and an optical transmission system.

To achieve the above object, the present invention provides a dispersion compensating method for compensating for waveform degradation of optical signal at least caused by a wavelength dispersion characteristic and a polarization mode dispersion characteristic of an optical transmission path, comprising the steps of: compensating a compensation amount for waveform degradation of optical signal by changing optical characteristics of the optical signal input via the optical transmission path; generating bit error information of the optical signal the waveform degradation of which has been compensated for; and controlling the compensation amount in the step of compensating for waveform degradation, based on the generated bit error information, so that the bit errors of the optical signal are reduced. Preferably, in the step of compensating for waveform degradation, the wavelength dispersion of the optical signal is compensated for making use of a variable dispersion compensator, to thereby simultaneously compensate for the polarization mode dispersion of the optical signal corresponding to a pulse forming effect due to an interaction between the wavelength dispersion and a chirping previously given to the optical signal.

According to such a dispersion compensating method, the compensation amount of the waveform degradation is feedback controlled based on the information concerning bit errors of the optical signal, thereby allowing to readily compensate for degradation of the optical signal waveform caused by wavelength dispersion and polarization mode dispersion of the optical transmission path, by a simplified controlling method. Particularly, by conducting the compensation of the waveform degradation making use of the variable dispersion compensator, it becomes possible to collectively compensate for the wavelength dispersion and polarization mode dispersion of the optical signal.

As a concrete procedure in the step of generating bit error information of the dispersion compensating method, a bit error rate of the optical signal the waveform degradation of which has been compensated for may be detected. Further, in case of applying an error-correcting code to the optical signal input via the optical transmission path, information concerning bit errors before error correction processing may be generated, or the number of bit errors at error correction processing may be detected.

As a concrete procedure in the step of controlling compensation amount in the dispersion compensating method, it is possible: to sweep, at initial setting, the compensation amount of the waveform degradation over a preset range, to thereby set the compensation amount of the waveform degradation to a point where the bit errors judged on the basis of the bit error information become the minimum; and to sequentially vary, during service operation, the compensation amount of the waveform degradation in a direction of reducing the bit errors at intervals of a preset step width when the bit errors judged on the basis of the bit error information have exceeded a preset threshold, to thereby reset the compensation amount of the waveform degradation to a point where the bit errors become the minimum.

Thereby, the compensation amount of the waveform degradation can be optimally controlled corresponding to the controlling modes at initial setting and during service operation, respectively.

Further, it is possible in the aforementioned dispersion compensating method that: the step of generating bit error information detects bit errors at preset measuring periods; and during service operation, the step of controlling compensation amount judges a bit error rate based on the number of detected bit errors within one measuring period of time to thereby control the compensation amount of the waveform degradation, in a situation where the detected bit errors are relatively numerous, and judges a bit error rate based on the number of measuring periods required until the detection of a predetermined number of bit errors to thereby control the compensation amount of the waveform degradation, in a situation where the detected bit errors are relatively less. With such a controlling method, it becomes possible to conduct the optimal control in a state where the number of occurred bit errors is less during service operation, and to conduct the rapid control in a state where the number of occurred bit errors is much, to thereby reduce an impact (occurrence of bit error) upon the service due to the waveform degradation. Further, it becomes possible to rapidly conduct the optimizing control of the compensation amount of the waveform degradation.

Moreover, in the aforementioned dispersion compensating method, when the optical signal input via the optical transmission path is a wavelength division multiplexed optical signal including a plurality of channel lights having different wavelengths from one another, the compensation of the waveform degradation and the control of the compensation amount may be conducted so as to correspond to each of the channel lights, or may be collectively conducted for the plurality of channel lights. This enables to readily compensate for the waveform degradation due to wavelength dispersion and polarization mode dispersion concerning the wavelength division multiplexed optical signal.

The aforementioned dispersion compensating method according to the present invention can be applied to a dispersion compensating apparatus and an optical transmission system to be used for long distance optical communications of a large capacity.

Further objects, features and advantages of the present invention will become more apparent from the following description of preferred embodiments when read in conjunction with the accompanying drawings.

DETAILED DESCRIPTION OF THE PREFERRED EMBODIMENT

There will be described hereinafter embodiments according the present invention, with reference to the accompanying drawings.

Figure 1:
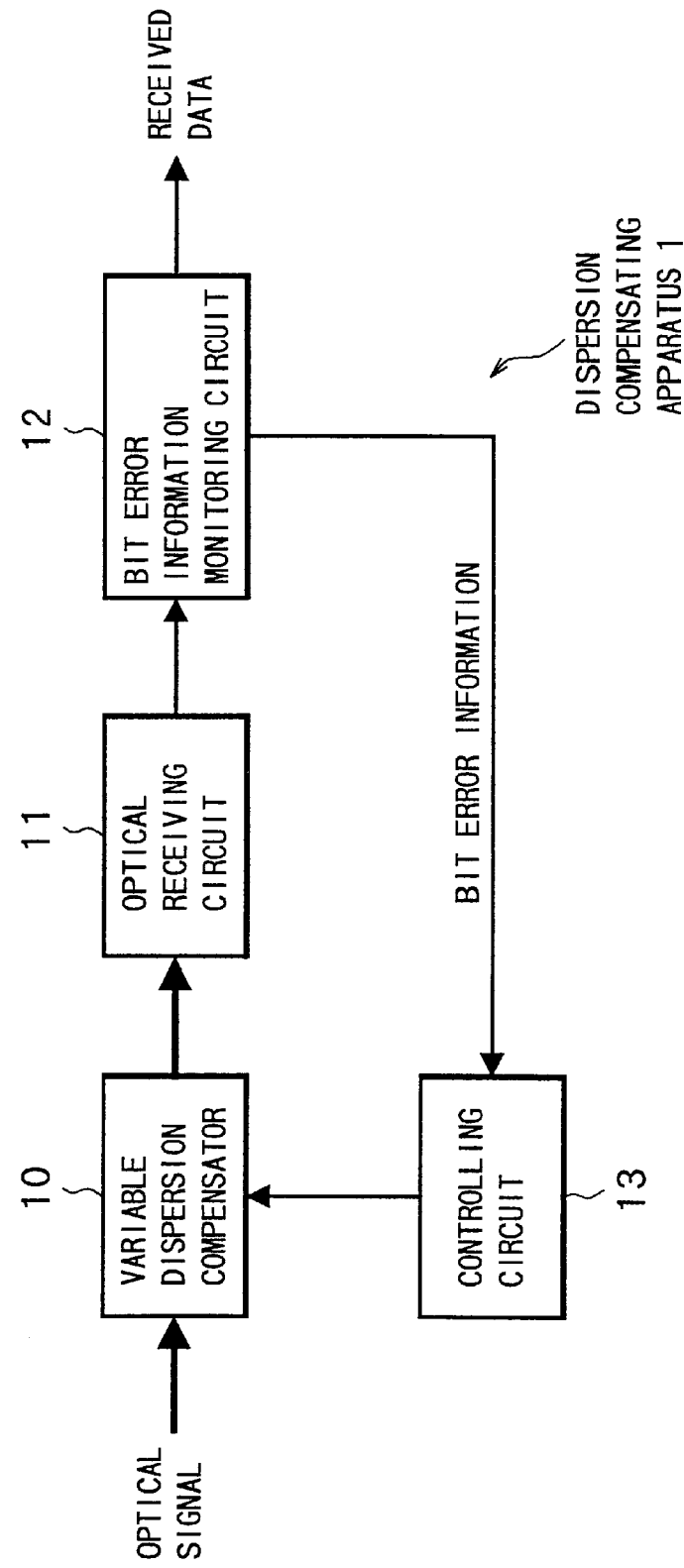
FIG. 1 is a block diagram showing a constitution of a dispersion compensating apparatus according to an embodiment of the present invention.

FIG. 1 is a block diagram showing a constitution of a dispersion compensating apparatus according to an embodiment of the present invention.

In FIG. 1, a dispersion compensating apparatus 1 comprises: a variable dispersion compensator 10 as a waveform degradation compensating section for compensating for wavelength dispersion in an optical signal to be input; an optical receiving circuit 11 and a bit error information monitoring circuit 12, cooperatively acting as a bit error information generating section for generating information concerning bit errors of the optical signal (hereinafter called "bit error information") to be output from the variable dispersion compensator 10; and a controlling circuit 13 as a controlling section for controlling a wavelength dispersion value (compensation amount) of the variable dispersion compensator 10 based on the bit error information generated by the bit error information monitoring circuit 12.

The optical signal to be input into the variable dispersion compensator 10 is provided through an optical transmission path not shown in FIG. 1, and is an optical signal at a higher bit rate such as 40 Gb/s, the waveform of which is degraded caused by the dispersion characteristics of the optical transmission path.

The variable dispersion compensator 10 is a known optical device capable of variably compensating for the wavelength dispersion of the input light. Specifically, the compensator may include the aforementioned VIPA (Virtually-Imaged-Phased-Array) device, or an optical device utilizing the FBG (Fiber-Bragg-Grating). As described later herein, this variable dispersion compensator 10 compensates for polarization mode dispersion of the input light, simultaneously with wavelength dispersion thereof.

The optical receiving circuit 11 receives the optical signal output from the variable dispersion compensator 10, converts the optical signal into an electrical signal, conducts known receive processing such as clock regeneration and data identification for the electrical signal, and outputs a receive-data signal indicating the processing result to the bit error information monitoring circuit 12.

The bit error information monitoring circuit 12 measures such as a bit error rate concerning the receive-data signal from the optical receiving circuit 11, and outputs the measuring result as the bit error information to the controlling circuit 13. As a concrete method for measuring a bit error rate, it is possible to utilize known measuring methods such as a method to conduct a parity check of a receive-data signal to thereby judge a bit error, and a method to use B1 byte or B2 byte of a signal conforming to SONET or SHD.

Figure 2:
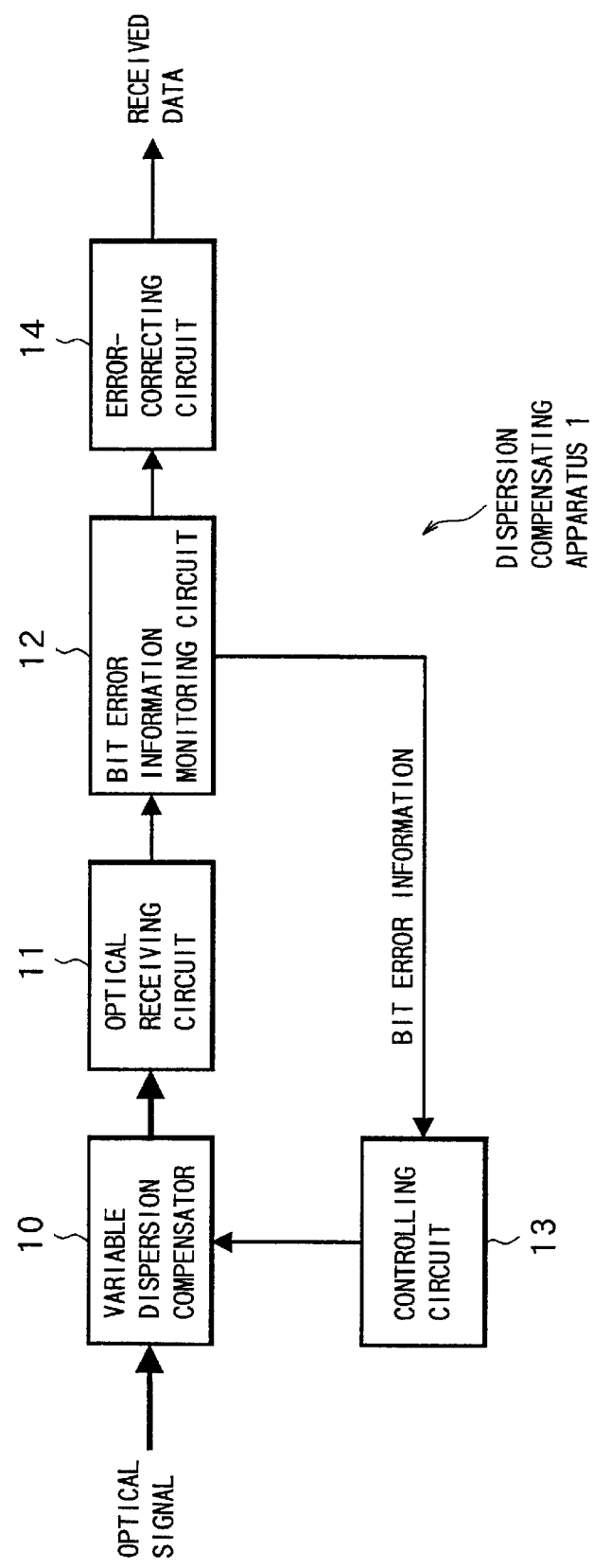
FIG. 2 is a block diagram showing an exemplary constitution in a case where an error-correcting circuit is provided in the embodiment.
Figure 3:
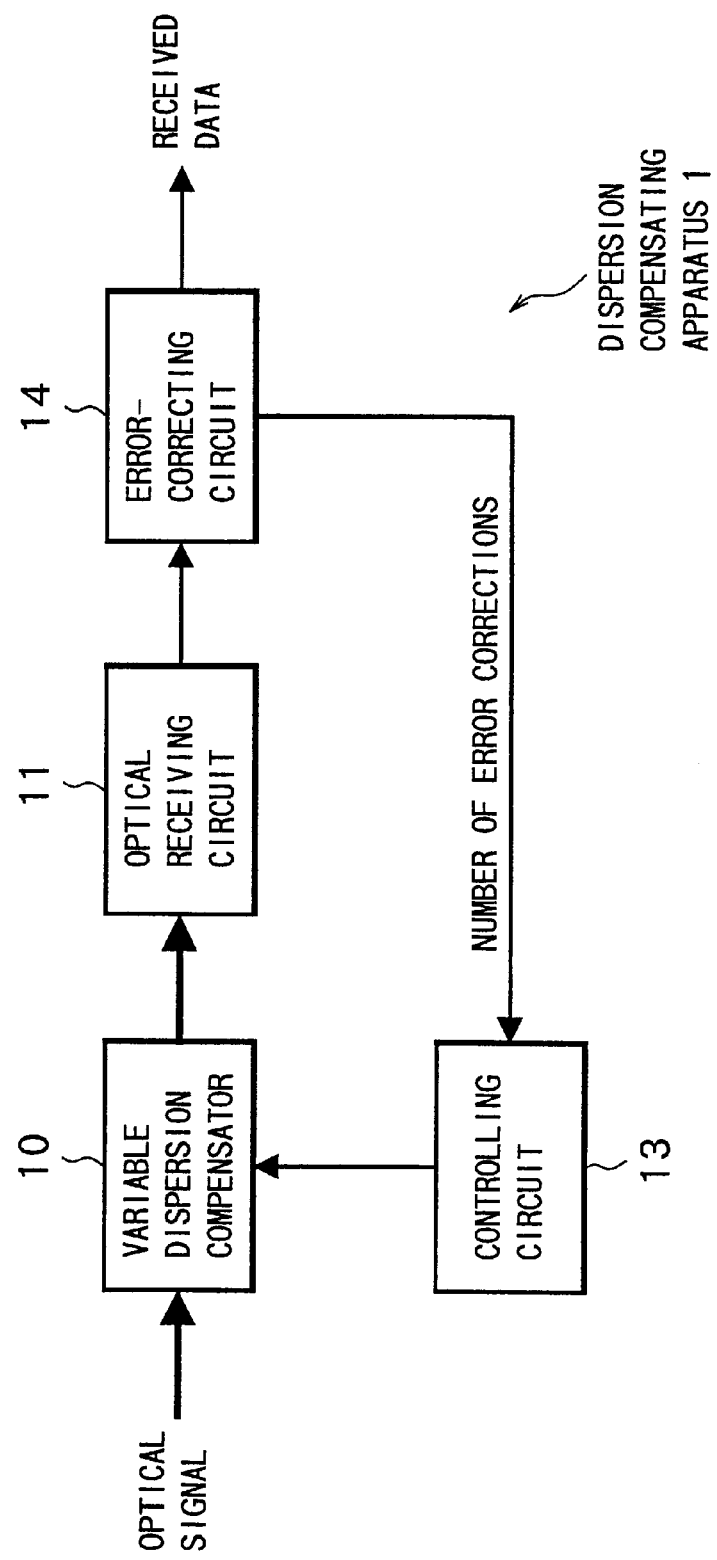
FIG. 3 is a block diagram showing another exemplary constitution in a situation where an error-correcting circuit is provided in the embodiment.

Preferably, in applying an error-correcting code to the optical signal to be input into the variable dispersion compensator 10, the bit error information monitoring circuit 12 is constituted: to measure a bit error in a state before error correction processing to be executed by an error-correcting circuit 14 concerning the receive-data signal from the optical receiving circuit 11, and to output the measuring result as bit error information to the controlling circuit 13 as shown in FIG. 2; or to output, as the bit error information, the number of error corrections to be detected at error correction processing in the error-correcting circuit 14, to the controlling circuit 13 as shown in FIG. 3. In applying an error-correcting code to the input light in this way, by measuring an error rate in a state before the error correction processing or utilizing the number of error corrections at the error correction processing, it becomes possible to restrict an impact (occurrence of bit error) upon the service, to a smaller degree.

The controlling circuit 13 automatically controls the compensation amount of wavelength dispersion at the variable dispersion compensator 10 based on the bit error information such as either the bit error rate or the number of error corrections to be sent from the bit error information monitoring circuit 12 or the error-correcting circuit 14. The concrete controlling method to be conducted by this controlling circuit 13 will be described later.

There will be now explained an operation of the aforementioned dispersion compensating apparatus.

There will be firstly explained an operation for compensating for degradation of an optical signal waveform caused by wavelength dispersion and polarization mode dispersion of the optical transmission path.

The degradation of an optical signal waveform due to wavelength dispersion is such that, when an optical signal having a rectangular pulse waveform is propagated through an optical transmission path such as constituted of an optical fiber, a post-transmission optical signal waveform becomes widened or compressed on the time axis, because propagation times of light differ from one another depending on respective wavelength components due to the wavelength dispersion characteristic of the optical transmission path. Such a degradation of the pulse waveform due to the wavelength dispersion can be compensated for by passing the optical signal through a dispersion compensator having a wavelength dispersion characteristic reverse to that of the optical transmission path, to thereby regenerate a rectangular pulse waveform equivalent to what has been transmitted.

Figure 4:
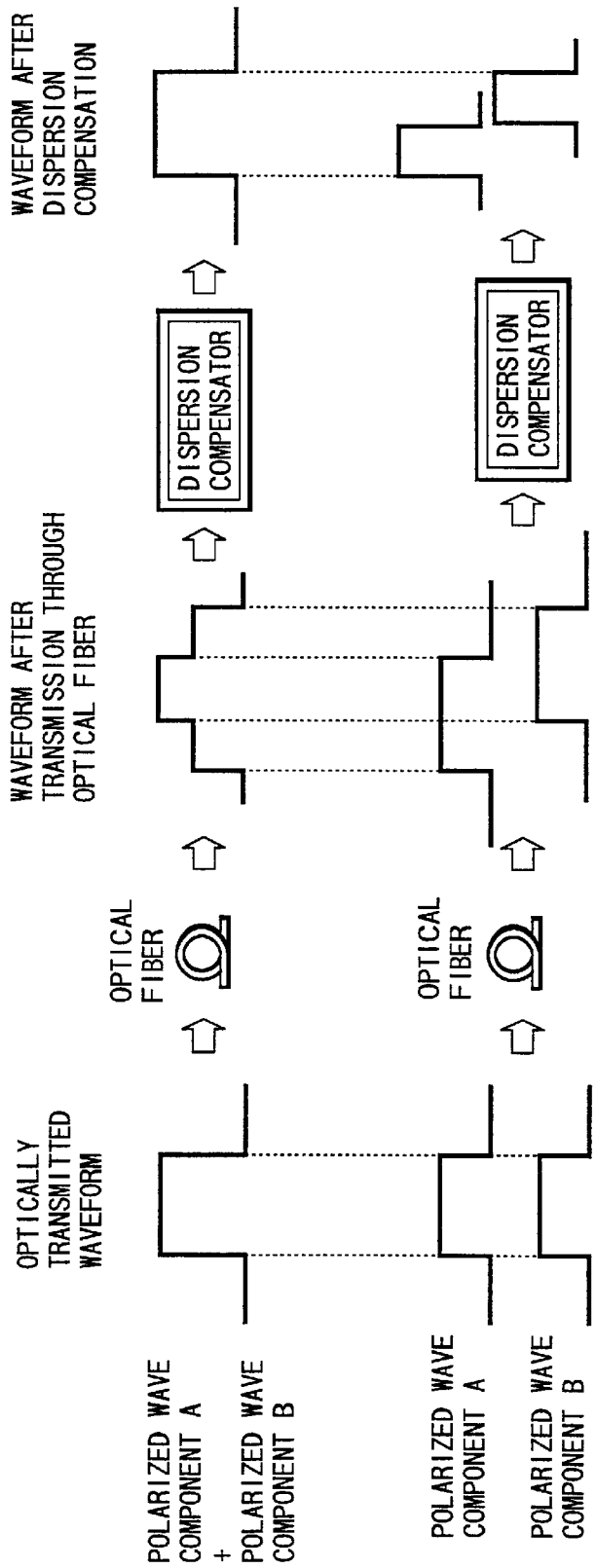
FIG. 4 is a diagram showing a simplified concept of polarization mode dispersion compensation in the present invention.

On the other hand, as shown in FIG. 4, degradation of an optical signal waveform due to polarization mode dispersion is such that, when an optical signal having polarized wave components A and B which are mutually orthogonal to each other and each has rectangular pulse waveform, is propagated through an optical transmission path, a difference occurs between the propagation times of the polarized wave components A and B due to the polarization mode dispersion characteristic of the optical transmission path, resulting in that a post-transmission optical signal waveform resulted from synthesizing polarized wave components A and B becomes widened on the time axis. Note, there is omitted the waveform change due to the wavelength dispersion characteristic of the optical transmission path, so as to simplify the explanation. Such a degradation of the pulse waveform due to polarization mode dispersion is compensated for by virtue of a pulse compression effect to be provided by a suitably set dispersion value of a dispersion compensator and wavelength chirping given to the optical signal in advance. Thus, there can be regenerated a rectangular pulse waveform substantially equivalent to what has been transmitted, in the post-compensation optical signal waveform resulted from synthesizing polarized wave components A and B.

Degradation of an optical signal waveform by actual polarization mode dispersion causes a distortion of the optical signal waveform, due to closely related phenomena such as: a distribution in the longitudinal direction of main axes of polarization of an optical fiber; variance in the longitudinal direction of a polarization mode dispersion amount of the optical fiber; fluctuation of polarization of signal light; and polarization mode dispersions in higher orders. Thus, it is difficult to fully compensate for the degradation of an optical signal waveform due to polarization mode dispersion. Nonetheless, it is possible to improve the waveform degradation, by causing pulse compression by duly setting a dispersion compensator when the waveform is widened due to polarization mode dispersion, or by causing pulse expansion by duly setting the dispersion compensator when the waveform is compressed due to polarization mode dispersion. The pulse compression and pulse expansion can be varied: by a sign of the wavelength chirping of the optical signal pulse, i.e., by a state as to whether the wavelength varies from a shorter wavelength to a longer wavelength over a period of time from a rising edge of the pulse to a falling edge of the pulse, or conversely varies from the longer wavelength to the shorter wavelength; and by the magnitude and sign (plus and minus) of a dispersion value summing the wavelength dispersion value of the optical transmission path and the wavelength dispersion value of the dispersion compensator. Note, the wavelength chirping is caused by an optical modulator of an optical sender and a nonlinear effect (self phase modulation) of the optical fiber.

Both of those aforementioned waveform degradations due to wavelength dispersion and polarization mode dispersion affect on a bit error of transmitted light. Thus, eventually, it becomes possible to simultaneously compensate for both of wavelength dispersion and polarization mode dispersion of an optical signal, by monitoring bit errors of the optical signal to optimally set a wavelength dispersion value of a dispersion compensator so that the monitored result is reduced. At this time, the wavelength dispersion of the optical transmission path can be compensated for, by setting the wavelength dispersion value of the dispersion compensator to a value substantially compensating for the wavelength dispersion of the optical transmission path. However, in order to also compensate for the waveform degradation due to polarization mode dispersion, the wavelength dispersion value of the dispersion compensator is set to a value slightly deviated from the value for substantially compensating for the wavelength dispersion of the optical transmission path. As described above, since the waveform degradations due to wavelength dispersion and polarization mode dispersion of the optical transmission path are basically a change such as an expansion or compression of the pulse, it is expedient to collectively compensate the waveform degradations due to both causes by the variable dispersion compensator 10, to thereby optimize the optical signal waveform.

There will be now described a concrete controlling method to be conducted by the controlling circuit 13.

The control of the variable dispersion compensator 10 by the controlling circuit 13 includes two controlling modes, namely the controlling mode at initial setting and the controlling mode during service operation. In the controlling mode at initial setting, a control is executed for setting the wavelength dispersion of the variable dispersion compensator 10 at an optimum value, corresponding to the length of the optical transmission path, the kind of optical fiber to be used, the wavelength of the optical signal to be transmitted, the characteristic variance of the optical fiber and the like.

Specifically, when the controlling mode at initial setting is started, a controlling signal is output from the controlling circuit 13 to the variable dispersion compensator 10 so as to cause the wavelength dispersion value of the variable dispersion compensator 10 to be swept within a preset range.

Then, the bit error information monitoring circuit 12 sequentially generates bit error information concerning the optical signal to be output from the variable dispersion compensator 10, and transmits the information to the controlling circuit 13. Here, for example, the bit error information monitoring circuit 12 measures the number of occurred bit errors (i.e., the bit error rate) during a preset measuring period concerning the received signal to be output from the variable dispersion compensator 10 via the optical receiving circuit 11, and the controlling circuit 13 obtains the optimum value of the wavelength dispersion of the variable dispersion compensator 10 based on the information of the bit error rates corresponding to the wavelength dispersion values of the variable dispersion compensator 10.

Figure 5:
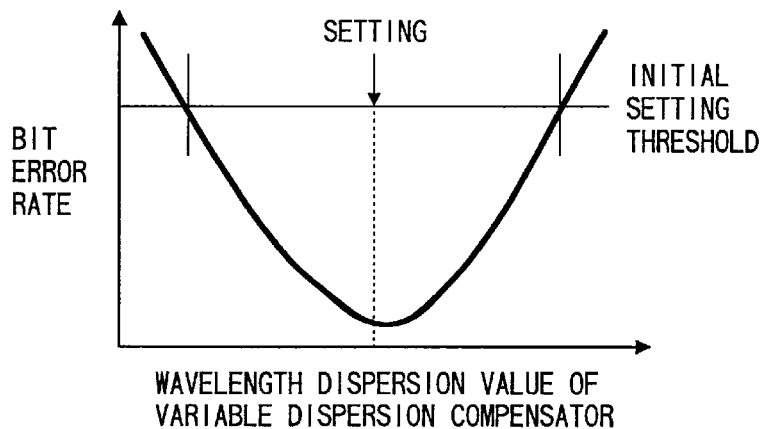
FIG. 5 is a graph for explaining a controlling method (at initial setting) for setting wavelength dispersion of a variable dispersion compensator of the present invention at an optimum value.

As shown in FIG. 5, for example, when a point where the bit error rate becomes the minimum is determined, the wavelength dispersion value of the variable dispersion compensator 10 at the minimum point is set as the optimum value. On the other hand, when a minimum point of the bit error rate is not determined, the optimum value of the wavelength dispersion of the variable dispersion compensator 10 may be set, for example, at a center (averaged value) of the respective wavelength dispersion values of the variable dispersion compensator between two points where the measured bit error rate curve intersects a preset threshold of the bit error rate (such as error rate of $10^{-9}$). In this way, by setting the wavelength dispersion of the variable dispersion compensator 10 at the optimum value corresponding to the bit error information obtained by the bit error information monitoring circuit 12, it becomes possible to realize the initial setting which provides a totally optimized optical signal waveform taking account of both of wavelength dispersion and polarization mode dispersion.

In the controlling mode during service operation, there is conducted a control to restrict the waveform degradation to the minimum, by varying the wavelength dispersion value of the variable dispersion compensator 10 corresponding to the waveform change caused such as by changes of the wavelength dispersion and polarization mode dispersion of the optical transmission path due to temperature fluctuation.

Specifically, during service operation, if the degradation of the optical signal waveform such as due to temperature fluctuation is advanced, finally a bit error occurs. Therefore, the controlling operation of the wavelength dispersion value of the variable dispersion compensator 10 is started, when the bit error rate to be measured by the bit error information monitoring circuit 12 has exceeded the preset bit error rate as a re-setting operation start threshold. Here, the controlling circuit 13 outputs, to the variable dispersion compensator 10, a controlling signal for causing the wavelength dispersion value of the variable dispersion compensator 10 to be sequentially varied at intervals of a preset step width, in a direction to reduce the bit error rate to be measured by the bit error information monitoring circuit 12. Note, the step width for varying the wavelength dispersion value of the variable dispersion compensator 10 is assumed to be set at a sufficiently narrow width which does not exceed a predetermined bit error rate (search operation threshold), so as to minimize an influence on the service in operation. Then, there is conducted the re-setting of the optimum value, by obtaining the optimum value of the wavelength dispersion of the variable dispersion compensator 10 by the controlling circuit 13, based on the information of the bit error rates corresponding to the varied wavelength dispersion values of the variable dispersion compensator 10.

Figure 6:
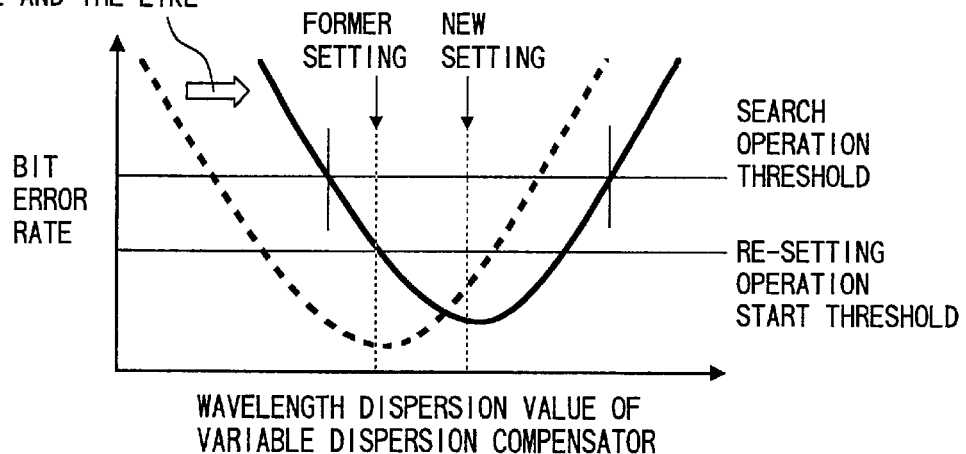
FIG. 6 is a graph for explaining a controlling method (during service operation) for setting the wavelength dispersion of the variable dispersion compensator of the present invention at an optimum value.

Concerning the re-setting of the optimum value, assuming such a situation as shown in FIG. 6, where the relationship between the wavelength dispersion value of the variable dispersion compensator 10 and the bit error rate is changed from a dotted line curve at the initial setting to a real line curve, such as due to a characteristic change of the optical transmission path, such a change in relationship results in an increase of bit errors in the wavelength dispersion value (former setting) of the variable dispersion compensator 10 under the initial setting, and thus, at the time when bit errors have exceeded the re-setting operation start threshold, the re-setting operation is started. As a concrete re-setting operation, the controlling circuit 13 judges a point where the bit error rate to be measured by the bit error information monitoring circuit 12 becomes the minimum, and the wavelength dispersion of the variable dispersion compensator 10 is set at an optimum value, in the same manner as the aforementioned initial setting. At this time, it is desired to conduct the re-setting operation in a situation of a lower bit error rate, in view of the influence on the service in operation. Further, in a situation of an increased number of bit errors, it is required to rapidly conduct the control to thereby restrict the influence on the service in operation to a small degree. To realize the above re-setting operation and control, it is useful to change over the control corresponding to a relative occurrence state of bit errors, as follows.

Namely, in a state of an increased number of occurred bit errors, the controlling circuit 13 judges the bit error rate based on the number of detected bit errors within one measuring period to be measured by the bit error information monitoring circuit 12, and rapidly controls the wavelength dispersion value of the variable dispersion compensator 10. On the other hand, in a state of a decreased number of occurred bit errors, the controlling circuit 13 judges a bit error rate based on the number of measuring periods which has been required until a predetermined number (one or more) of bit errors is detected by the bit error information monitoring circuit 12, and controls the wavelength dispersion value of the variable dispersion compensator 10. In this way, it becomes possible to rapidly conduct the optimizing control of the variable dispersion compensator 10, without affecting on the service in operation, or with minimizing the influence on the service in operation.

Further, it becomes possible to rapidly conduct the dispersion compensation control while avoiding the influence on the service, by applying an error-correcting code to the input light and by measuring a bit error rate of a signal in a state before the error correction processing, or by utilizing the number of error correction at the error correction processing.

However, when the bit error rate measured by the bit error information monitoring circuit 12 is unchanged even by changing the wavelength dispersion value of the variable dispersion compensator 10 in the aforementioned manner, it is supposed that the cause of occurrence of bit errors resides in a portion other than the optical transmission path. In such a case, it is enough to bring the wavelength dispersion value of the variable dispersion compensator 10 back to its former value.

Further, the dispersion compensating apparatus of the present invention not only compensates for wavelength dispersion and polarization mode dispersion, but also effectively acts on the variance, temperature changes and changes with time of characteristics of various circuits. Factors affecting on a signal waveform include characteristics of various circuits from a transmitting circuit to a receiving and identifying circuit, such as an optically transmitted waveform, a frequency characteristic of an optical receiving circuit, nonlinear effects of optical filters such as of multiplexer/demultiplexer, nonlinear effects of optical fibers, and a characteristic of the dispersion compensating apparatus itself, as well as waveform changes to be caused by any combination of the above factors. Concerning the variance of characteristics of various circuits, the waveform is automatically set at the initial setting so as to provide the totally optimum waveform and bit error rate, thereby allowing to derive the best total performance of the system as a whole. Also, concerning the temperature change and changes with time of various characteristics, the waveform is automatically set to derive the best performance so that bit errors are always minimized.

According to the aforementioned dispersion compensating apparatus of this embodiment, the wavelength dispersion of the variable dispersion compensator 10 is feedback controlled to the optimum value based on the bit error information, thereby it becomes possible to collectively compensate for, by a simplified controlling method, such a degradation of an optical signal waveform caused by wavelength dispersion and polarization mode dispersion of the optical transmission path. Specifically, the polarization state is not controlled. Thus, unlike the conventional technique, it becomes unnecessary to conduct the rapid polarization control for keeping track of fluctuation of the polarization state such as due to vibration of the optical fiber. Therefore, it becomes possible to realize the optimization of optical signal waveform, by simply controlling the wavelength dispersion value of the singular variable dispersion compensator 10. Further, the apparatus constitution is simplified as compared with the conventional technique, to thereby allow downsizing and a reduced cost.

There will be described hereinafter embodiments of an optical transmission system according to the present invention.

Figure 7:
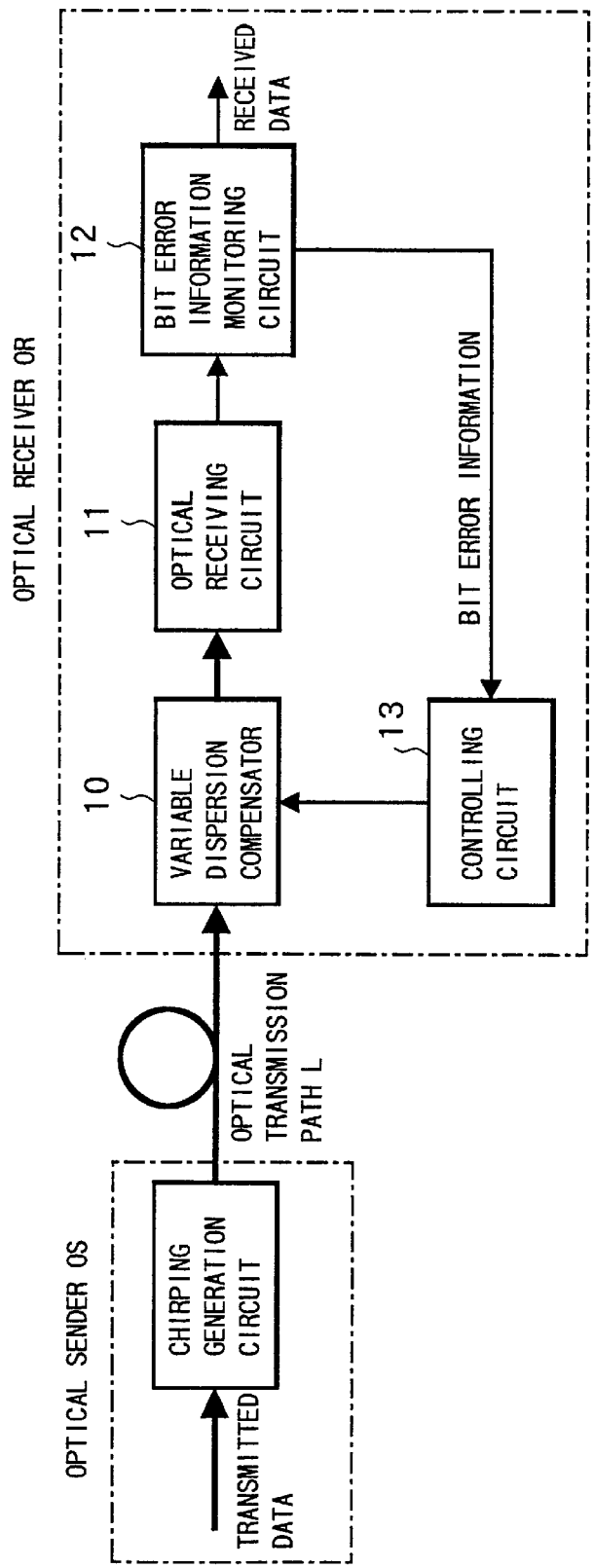
FIG. 7 is a block diagram showing a constitution of an optical transmission system according to a first embodiment of the present invention.

FIG. 7 is a block diagram showing a constitution of an optical transmission system according to a first embodiment of the present invention.

This optical transmission system in FIG. 7 includes the dispersion compensating apparatus 1 of FIG. 1 in an optical receiver OR, concerning a system constitution for transmitting an optical signal sent from an optical sender OS to the optical receiver OR via an optical transmission path L. Like reference numerals as used for the aforementioned dispersion compensating apparatus 1 are used to denote identical elements, and the same rule applies corresponding to the following embodiments.

The optical sender OS is a known one for generating an optical signal of a single wavelength to transmit the optical signal to the optical transmission path L, in this embodiment. This optical sender OS includes a chirping generation circuit for applying chirping to the optical signal to be transmitted. Although not shown, the optical sender OS may be provided with a coder for applying an error-correcting code to the optical signal to be transmitted. In this case, the optical receiver OR is to be provided with a decoder corresponding to the error-correcting code to be applied to the transmitted light. The optical transmission path L is constituted making use of an optical fiber and the like, and gives wavelength dispersion and polarization mode dispersion such as corresponding to the kind and length of the optical fiber, to the optical signal to be transmitted. Although not shown here, it is possible to arrange an optical repeater (s) anywhere along the optical transmission path L.

The optical receiver OR is constituted by applying the aforementioned dispersion compensating apparatus 1 of FIG. 1 to an optical receiver having a known constitution.

Figure 8:
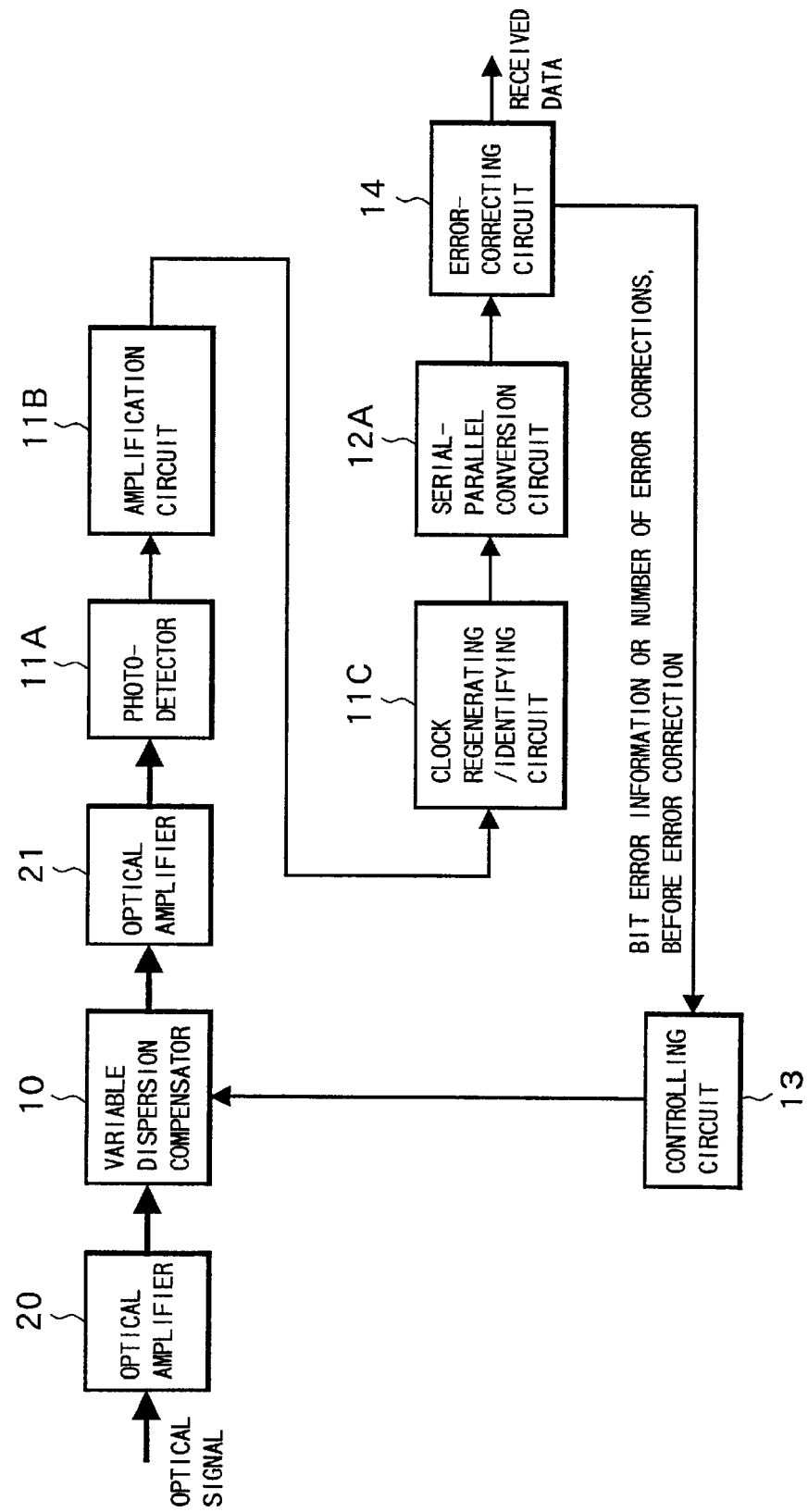
FIG. 8 is a block diagram showing an exemplary concrete constitution of an optical receiver to be used in the optical transmission system of the first embodiment.

FIG. 8 shows a more concrete exemplary constitution of the optical receiver OR. In the exemplary constitution of FIG. 8, the optical signal from the optical transmission path L is amplified to a required level by an optical amplifier 20, and then transmitted to the variable dispersion compensator 10. The output light from the variable dispersion compensator 10 is sent to a photodetector 11A to be converted into an electrical signal, after the loss in the output light caused by the variable dispersion compensator 10 has been compensated for by an optical amplifier 21. Further, the output signal of the photodetector 11A is amplified by an amplification circuit 11B to a required level, and then processed by a clock regenerating/identifying circuit 11C, to thereby generate a receive-data signal. This receive-data signal is sent, via serial-parallel conversion circuit 12A, to the error-correcting circuit 14 corresponding to the aforementioned decoder to be subjected to the error correction processing. The error-correcting circuit 14 notifies the controlling circuit 13 of the bit error information concerning the received signal before the error correction processing, or of the number of error corrections at the error correction processing. Then, the controlling circuit 13 controls the wavelength dispersion of the variable dispersion compensator 10 to an optimum value, based on the bit error information from the error-correcting circuit 14. Note, the constitution of the optical receiver OR in the present invention is not limited to the example shown in FIG. 8.

In such an optical transmission system, the wavelength dispersion value of the variable dispersion compensator 10 provided in the optical receiver OR is optimized corresponding to the controlling modes at initial setting and during service operation, identically with the aforementioned situation, so that the degradation of the optical signal waveform due to the wavelength dispersion characteristic and polarization mode dispersion characteristic of the optical transmission path L is automatically compensated for. Thereby, it becomes possible to realize an optical transmission system capable of stably transmitting a high-speed optical signal such as at 40 Gb/s over a long distance.

There will be described hereinafter an optical transmission system according to a second embodiment of the present invention.

Figure 9:
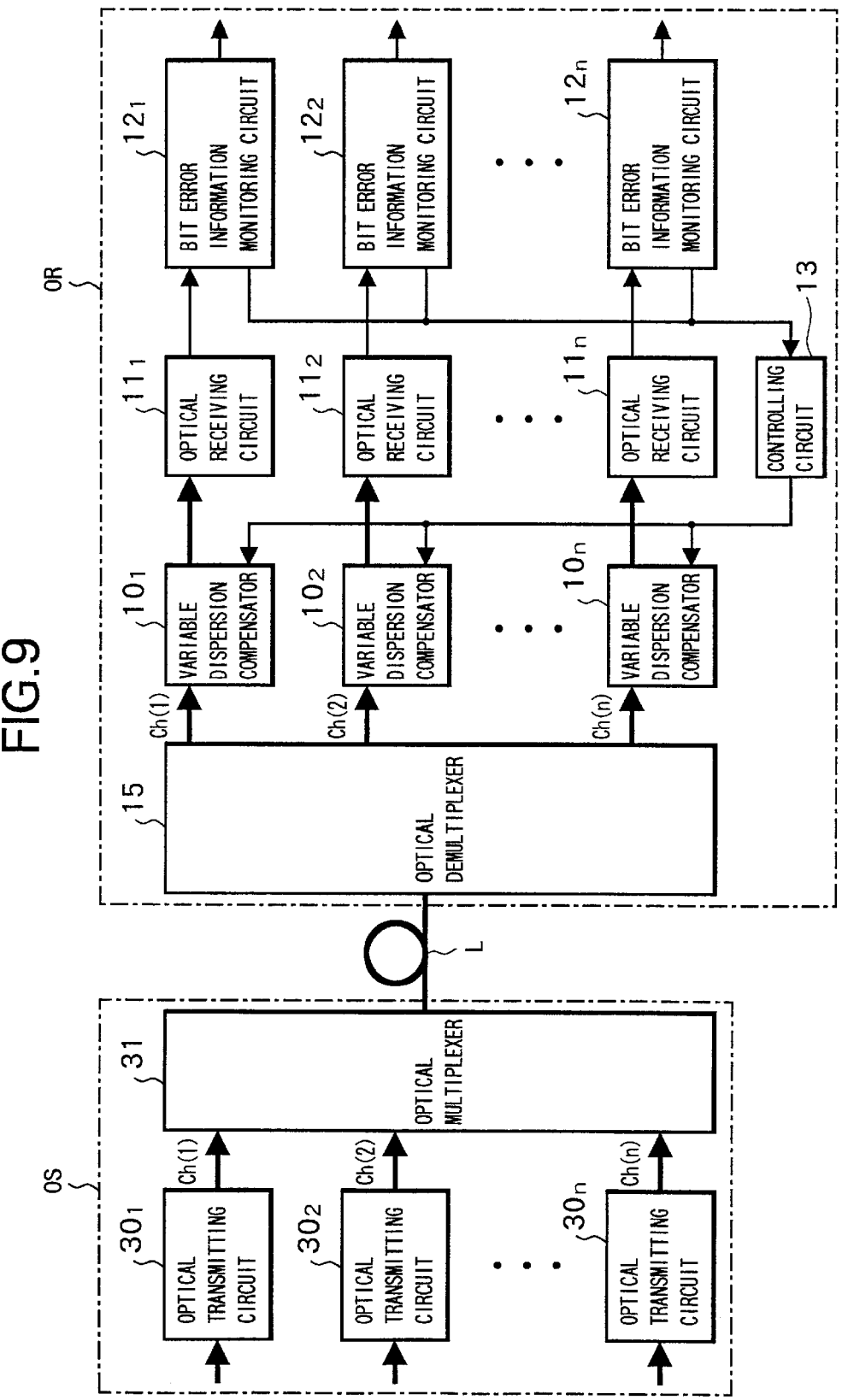
FIG. 9 is a block diagram showing a constitution of an optical transmission system according to a second embodiment of the present invention.

FIG. 9 is a block diagram showing a constitution of an optical transmission system according to the second embodiment of the present invention.

The optical transmission system of this embodiment in FIG. 9 is provided by applying the present invention to a so-called WDM optical transmission system in which the optical sender OS transmits, to the optical receiver OR, a wavelength division multiplexed (WDM) optical signal including a plurality of channel lights having different wavelengths from one another. Specifically, the optical sender OS includes: optical transmitting circuits $30_1$, $30_2$, ... $30_n$ corresponding to n wavelengths of channel lights, respectively; and an optical multiplexer 31 for multiplexing channel lights Ch(1) to Ch(n) at respective wavelengths output from the optical transmitting circuits $30_1$, ... $30_n$, to transmit multiplexed optical signal to the optical transmission path L. Although not shown here, it is assumed that each of the optical transmitting circuits $30_1$, ... $30_n$ is provided with a chirping generation circuit. Further, the optical receiver OR includes an optical demultiplexer 15 for demultiplexing the WDM optical signal from the optical transmission path L into the channel lights Ch(1) to Ch(n) of the respective wavelengths, and applies the constitution of the dispersion compensating apparatus 1 shown in FIG. 1 to each of the channel lights Ch(1) to Ch(n)

output from the optical demultiplexer 15. However, the controlling circuit 13 for controlling the wavelength dispersion values of variable dispersion compensators $10_1$ to $10_n$ corresponding to the channel lights Ch(1) to Ch(n), respectively, is shared by the channel lights Ch(1) to Ch(n) to thereby simplify the constitution.

Figure 10:
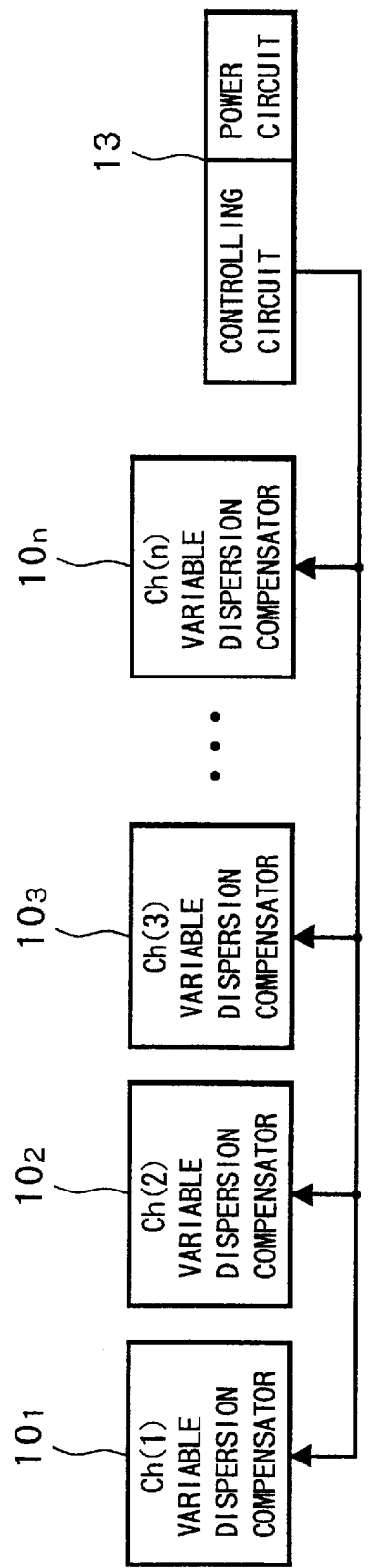
FIG. 10 is a view showing an exemplary concrete constitution of variable dispersion compensators and a controlling circuit in the optical transmission system of the second embodiment.
Figure 11:
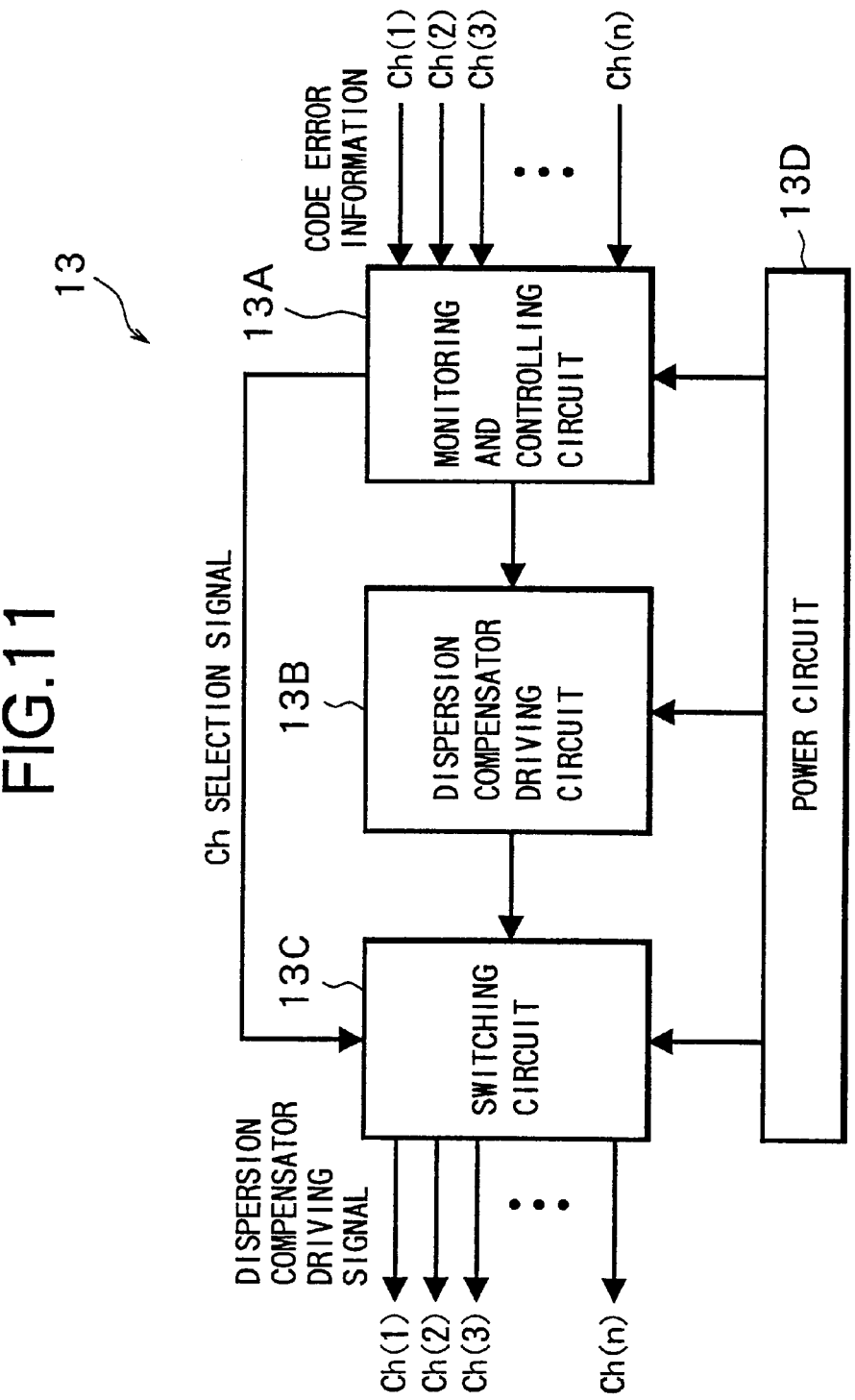
FIG. 11 is a view showing an exemplary concrete circuit configuration of the controlling circuit in FIG. 10.

As concrete constitutions of the variable dispersion compensators $10_1$ to $10_n$ and the controlling circuit 13, as shown in FIG. 10, the controlling circuit 13 may be provided with a shared power circuit for driving the variable dispersion compensators $10_1$ to $10_n$. FIG. 11 shows a more concrete exemplary constitution of the controlling circuit 13 in the above situation.

In the controlling circuit 13 of FIG. 11, monitored by a monitoring and controlling circuit 13A is the pieces of bit error information sent from bit error information monitoring circuits $12_1$ to $12_n$ corresponding to the channel lights Ch(1) to Ch(n), respectively. This monitoring and controlling circuit 13A selects any one of the variable dispersion compensators $10_1$ to $10_n$ the wavelength dispersion value of which is to be controlled, based on the monitored results of the respective pieces of bit error information. The monitoring and controlling circuit 13A further outputs, to a dispersion compensator driving circuit 13B, a controlling signal for optimizing the wavelength dispersion value of the selected variable dispersion compensator, and outputs, to a switching circuit 13C, a Ch selection signal indicative of the selected variable dispersion compensator. For example, at initial setting, as a concrete monitoring and controlling method, the variable dispersion compensators to be subjected to the optimizing control are sequentially changed over so as to conduct a setting operation of a pertinent variable dispersion compensator based on the bit error information of the corresponding channel light. During service operation, there are constantly monitored those pieces of bit error information concerning all of the channel lights, and there is conducted the optimizing control of the wavelength dispersion value of the variable dispersion compensator corresponding to the channel light in which bit errors exceeding the re-setting operation start threshold has occurred. Note, if bit errors of a plurality of channel lights have simultaneously exceeded the re-setting operation start threshold, the optimizing control shall be preferentially conducted for the variable dispersion compensator corresponding to the channel light which has a higher bit error rate.

The dispersion compensator driving circuit 13B, which has received the controlling signal from the monitoring and controlling circuit 13A, generates a driving signal for driving the variable dispersion compensator in accordance with the controlling signal while receiving a power supplied from a power circuit 13D, to output the driving signal to the switching circuit 13C. The switching circuit 13C sends the driving signal from the dispersion compensator driving circuit 13B to the corresponding variable dispersion compensator, in accordance with the Ch selection signal. Here, the power from the power circuit 13D is also utilized for driving the monitoring and controlling circuit 13A and the switching circuit 13C.

Figure 12:
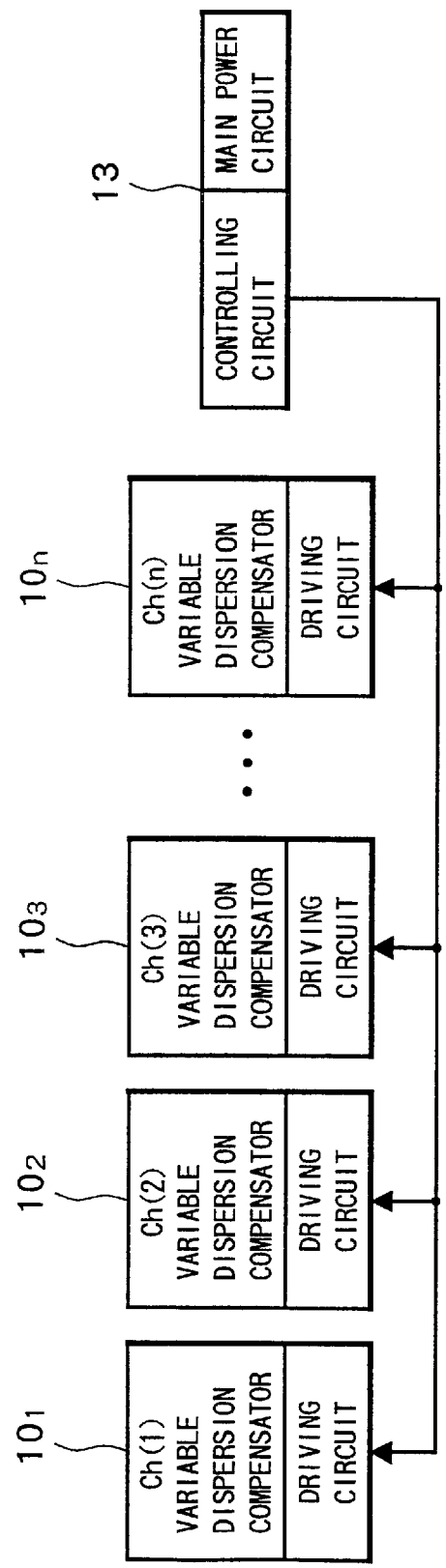
FIG. 12 is a view showing an exemplary constitution in a case where driving circuits of respective variable dispersion compensators are individually provided, concerning the constitution of FIG. 10.

In the aforementioned exemplary circuit configuration of the controlling circuit 13, the driving circuit is shared for the variable dispersion compensators $10_1$ to $10_n$. However, it is possible to provide individual driving circuits for the variable dispersion compensators $10_1$ to $10_n$, respectively, as shown in FIG. 12.

Figure 13:
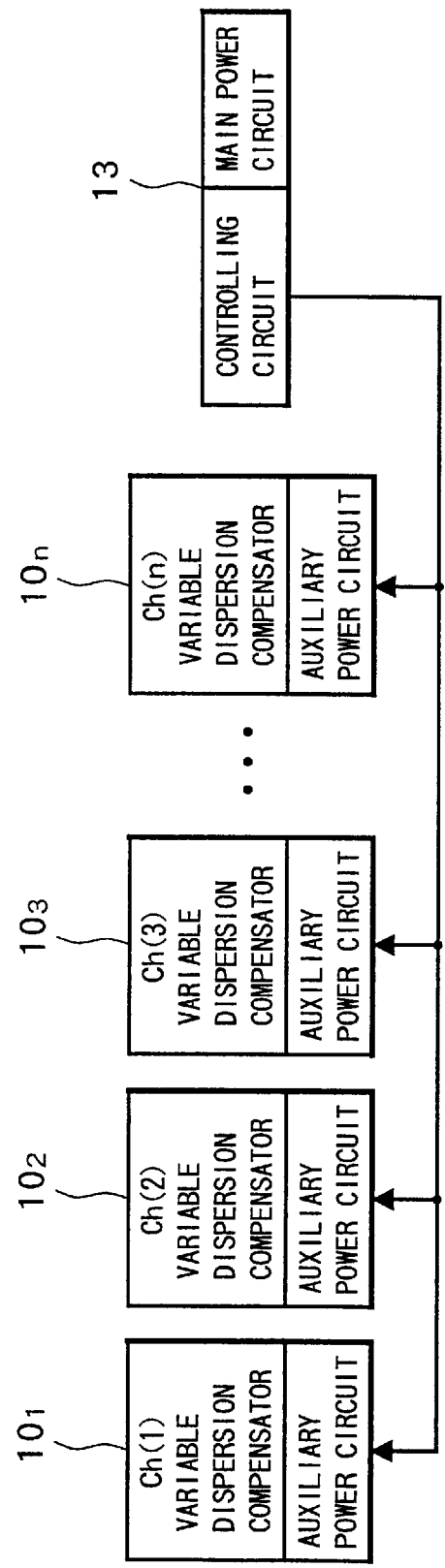
FIG. 13 is a view showing another exemplary concrete constitution of variable dispersion compensators and a controlling circuit in the optical transmission system of the second embodiment of the present invention.

Further, as other concrete constitutions of the variable dispersion compensators $10_1$ to $10_n$ and controlling circuit 13, it is also possible as shown in FIG. 13 to provide auxiliary power circuits for stand-by control of the variable dispersion compensators $10_1$ to $10_n$, respectively, and to provide a main power circuit for setting-change control inside the controlling circuit 13 to be shared for the variable dispersion compensators $10_1$ to $10_n$. The exemplary concrete constitution of the controlling circuit 13 in this case is basically the same as that shown in FIG. 11.

According to the aforementioned optical transmission system of the second embodiment, it also becomes possible to automatically compensate for waveform degradations of the respective channel lights due to wavelength dispersion and polarization mode dispersion, in a system for conducting transmission of WDM optical signal, by providing the variable dispersion compensators $10_1$ to $10_n$ corresponding to the channel lights Ch(1) to Ch(n) at respective wavelengths, and by optimally controlling the wavelength dispersion values of variable dispersion compensators $10_1$ to $10_n$ based on the pertinent pieces of bit error information of the channel lights Ch(1) to Ch(n), respectively. Further, it becomes possible to achieve further downsizing and a reduced cost by virtue of the simplified constitution of the optical receiver OR, by making the controlling circuit 13 for controlling the wavelength dispersion values of variable dispersion compensators $10_1$ to $10_n$, and the power circuit, the driving circuit and the like to be shared for the variable dispersion compensators $10_1$ to $10_n$. Thus, it becomes possible to the size and cost of a dispersion compensating part, which has been obstructing a practical use of a long distance optical transmission system such as at 40 Gb/s.

Figure 14:
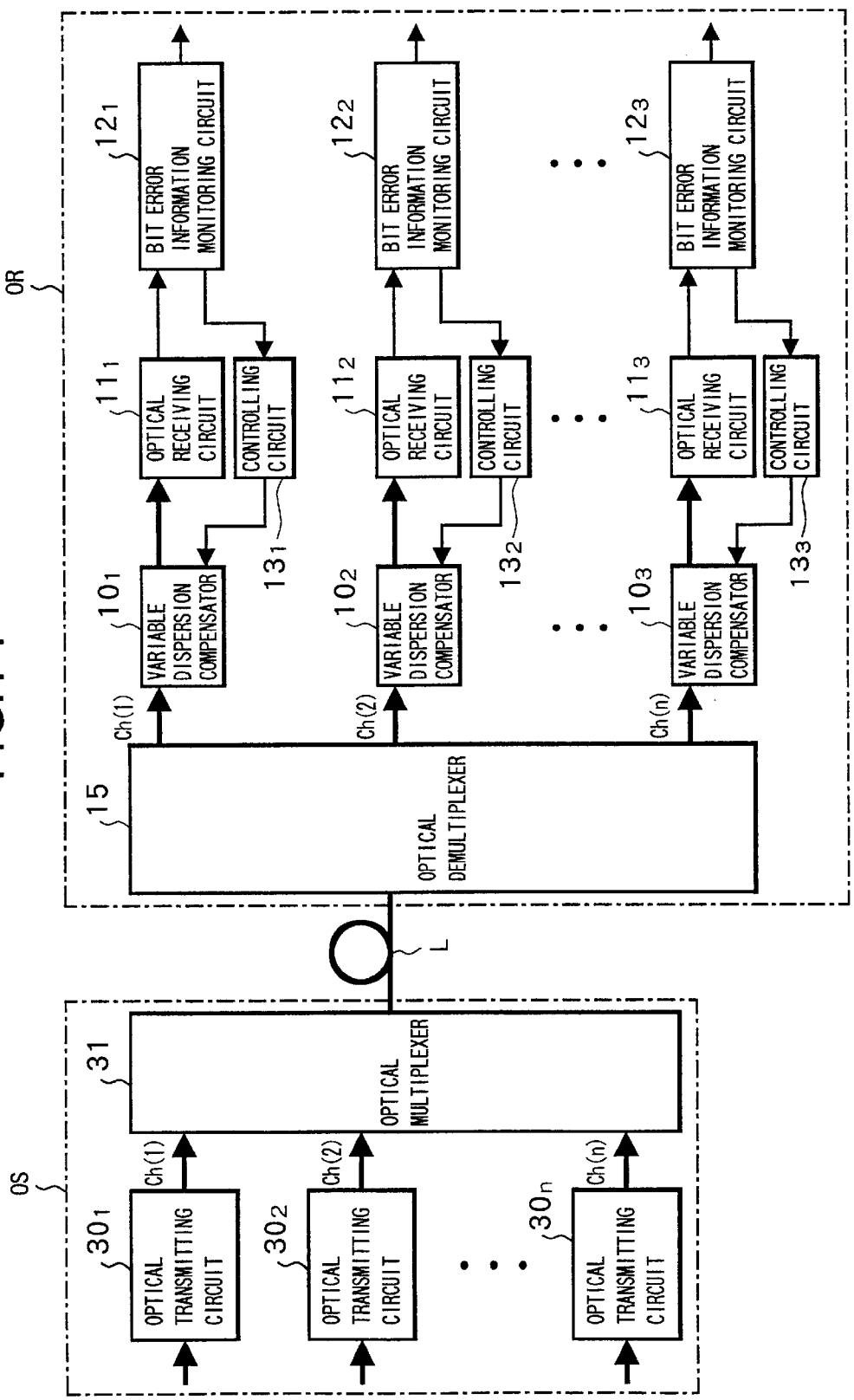
FIG. 14 is a view showing a system constitution in a case where controlling circuits are provided for respective variable dispersion compensators, concerning the optical transmission system of the second embodiment.
Figure 15:
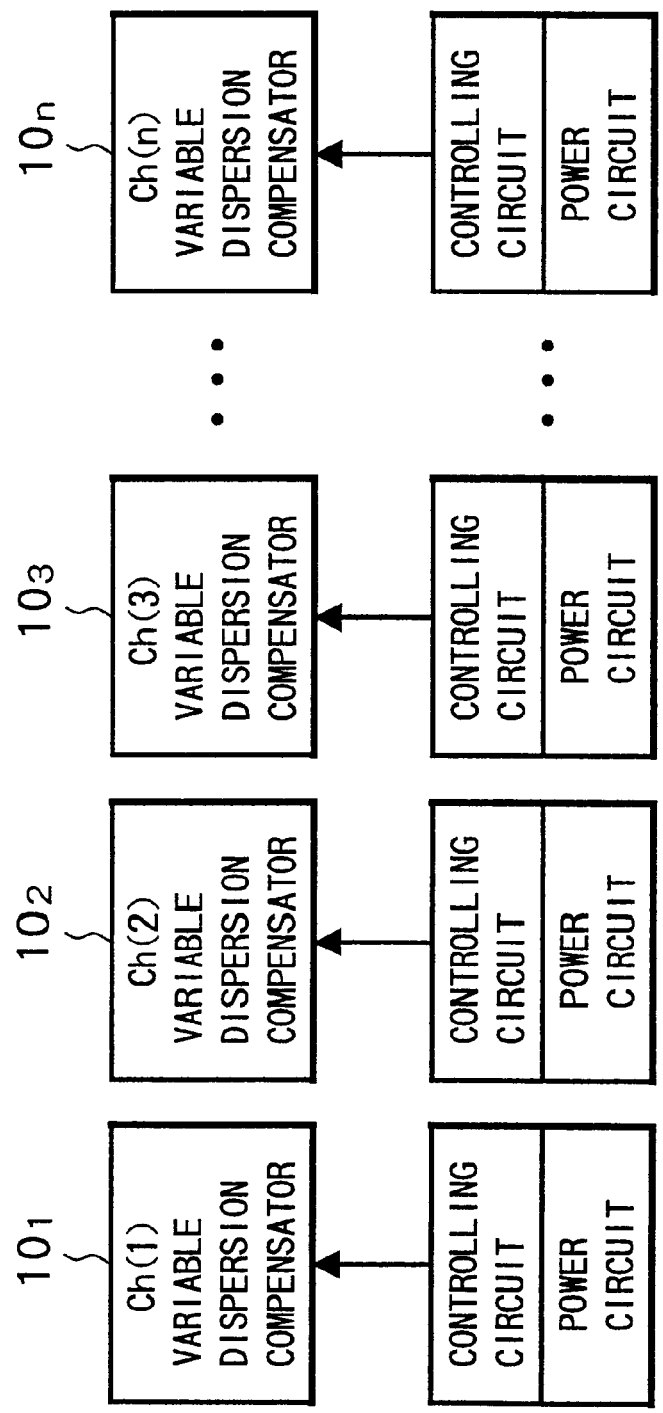
FIG. 15 is a view showing an exemplary constitution of controlling circuits and power circuits in the system constitution of FIG. 14.

In the aforementioned optical transmission system of the second embodiment, the controlling circuit 13 and the power circuit are shared so as to correspond to the variable dispersion compensators $10_1$ to $10_n$. However, in the present invention, it is possible to provide a controlling circuit and a power circuit for each of the variable dispersion compensators $10_1$ to $10_n$, as shown in FIGS. 14 and 15. In this case, although the constitution of the system becomes slightly complicated as compared with the aforementioned second embodiment, it is still possible to conduct a simplified compensation control with a sufficiently simplified constitution insofar as compared with the conventional constitution in which wavelength dispersion compensation and polarization mode dispersion compensation are separately conducted.

Figure 16:
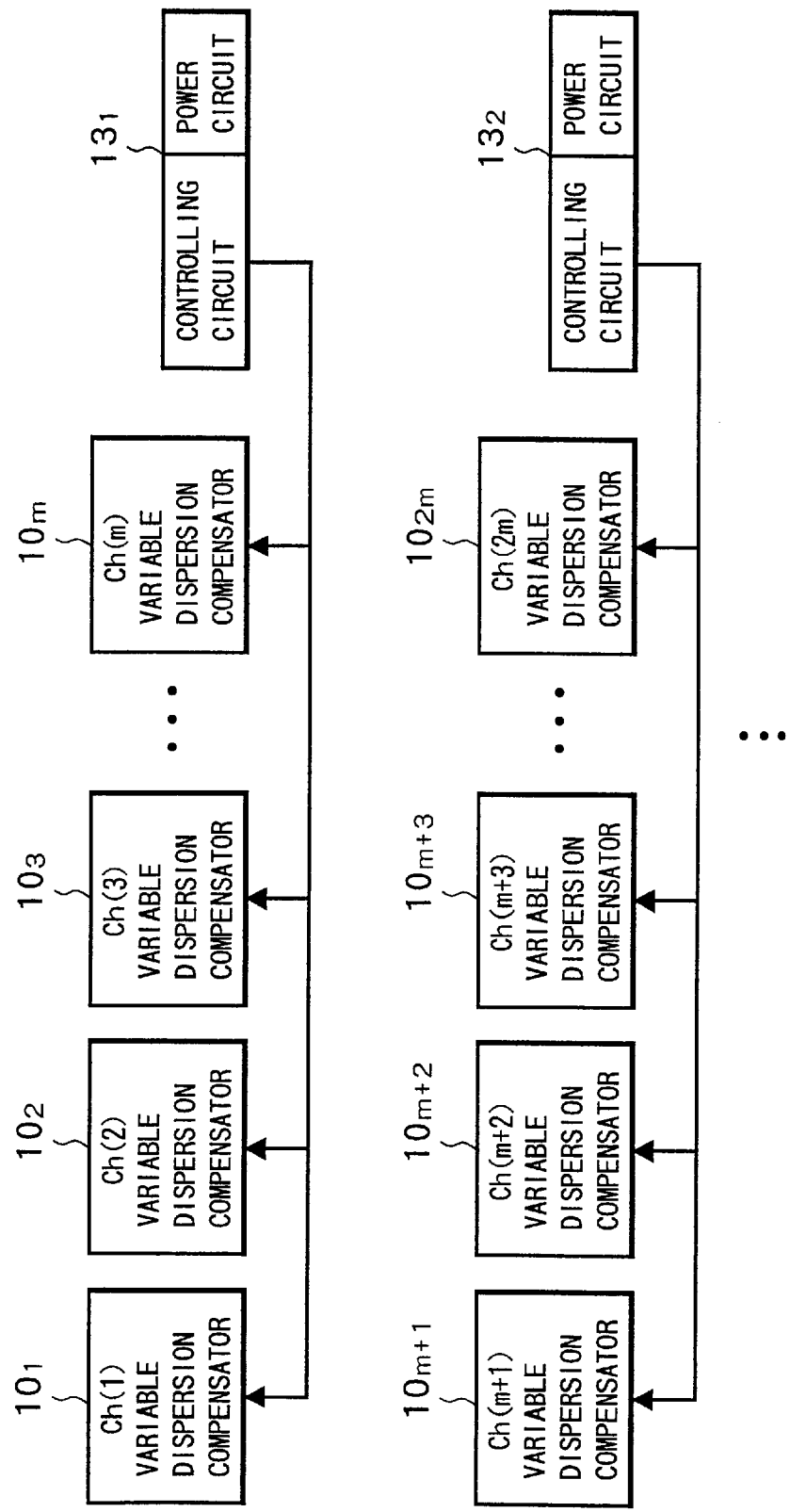
FIG. 16 is a view showing an exemplary constitution in a case where controlling circuit and the like are shared for each subset, concerning the optical transmission system of the second embodiment.

Further, in the aforementioned optical transmission system of the second embodiment, the single controlling circuit 13 is provided to be shared for all of the channel lights Ch(1) to Ch(n). However, the present invention is not limited thereto. For example, such an adaptation as shown in FIG. 16 is possible in which the channel lights to be used in the system are grouped into subsets for each m wavelengths, and such as a controlling circuit and a power circuit are shared for each subset.

There will be now described an optical transmission system according to a third embodiment of the present invention.

Figure 17:
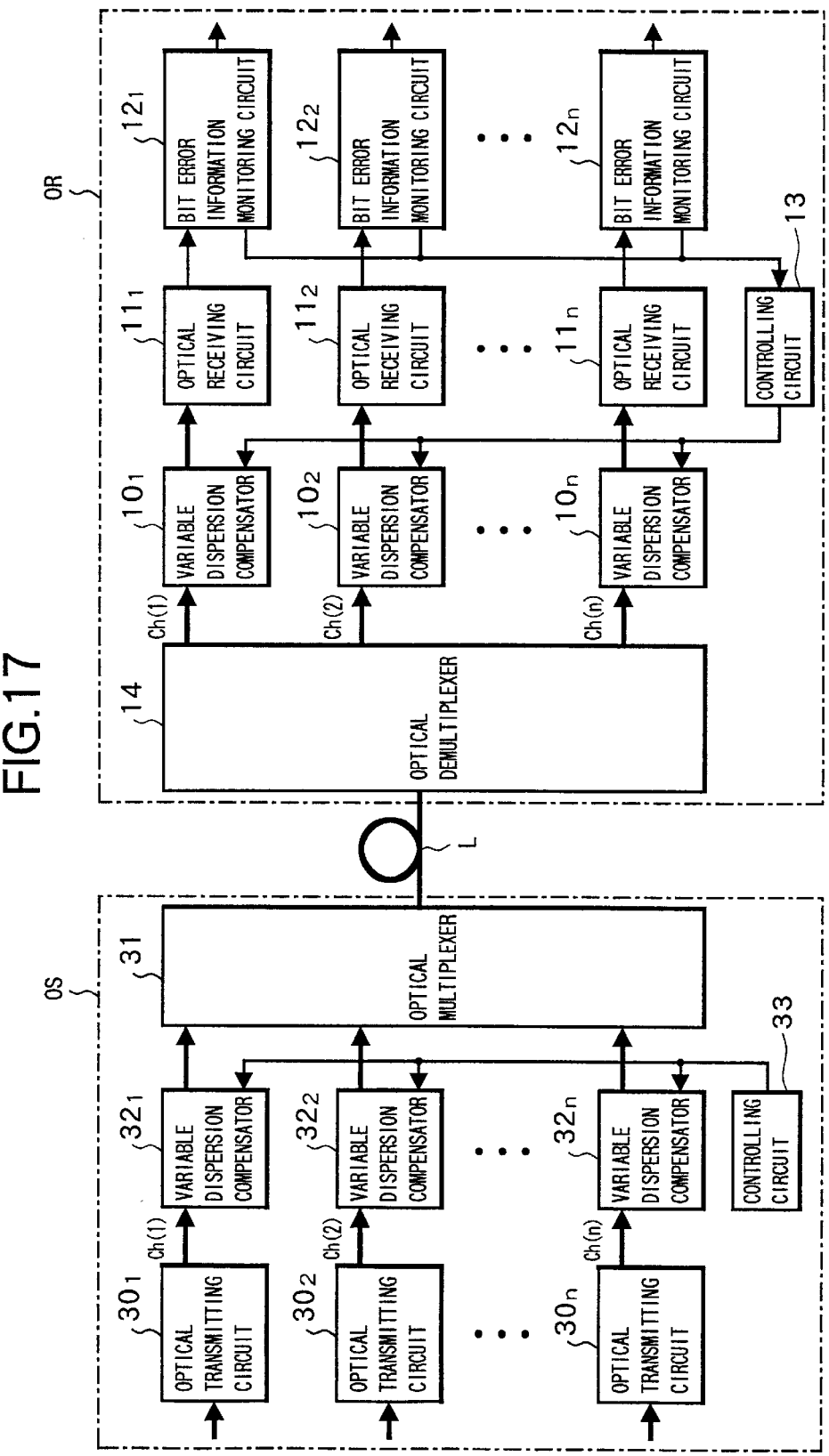
FIG. 17 is a block diagram showing a constitution of an optical transmission system according to a third embodiment of the present invention.

FIG. 17 is a block diagram showing a constitution of an optical transmission system according to the third embodiment of the present invention.

In FIG. 17, this optical transmission system is constituted such that, in the system constitution of the second embodiment shown in FIG. 9, variable dispersion compensators $32_1, 32_2, \ldots 32_n$ are provided at the optical sender OS side, so as to correspond to the channel lights Ch(1) to Ch(n) and a controlling circuit 33 is provided for controlling the wavelength dispersion values of the respective variable dispersion compensator $32_1$ to $32_n$. The constitution of the optical sender OS other than those described above, and the constitutions of the optical receiver OR and the optical transmission path L are identical with those of the second embodiment.

Similarly to the variable dispersion compensators $10_1$ to $10_n$ at the optical receiver OR side, the variable dispersion compensator $32_1$ to $32_n$ provided at the optical sender OS side are known optical devices capable of variably compensating for wavelength dispersions of input lights, and may specifically include such as VIPA devices, or optical devices utilizing FBG.

Figure 18:
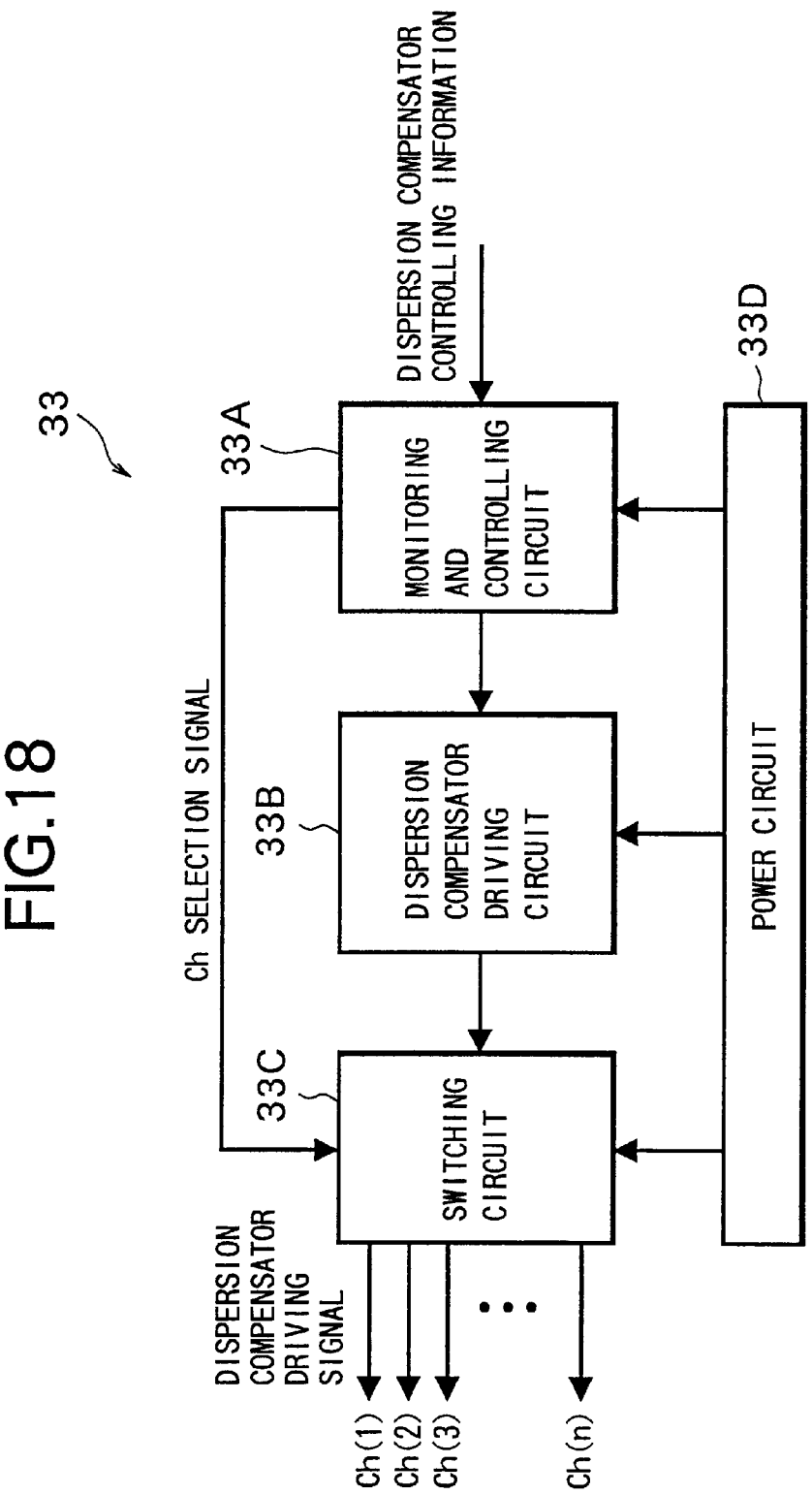
FIG. 18 is a view showing an exemplary concrete circuit configuration of a controlling circuit at an optical sender side of FIG. 17.

In the controlling circuit 33 as shown in a concrete circuit configuration diagram of FIG. 18, dispersion compensator controlling information sent from the exterior of the optical sender OS or from the optical receiver OR is input into a monitoring and controlling circuit 33A to be monitored. This monitoring and controlling circuit 33A selects any one of the variable dispersion compensator $32_1$ to $32_n$, the wavelength dispersion value of which is to be controlled, from among the variable dispersion compensator $32_1$ to $32_n$, in accordance with the dispersion compensator controlling information, outputs a controlling signal for controlling the wavelength dispersion value of the selected variable dispersion compensator to a dispersion compensator driving circuit 33B, and outputs a Ch selection signal indicative of the selected variable dispersion compensator to a switching circuit 33C. The dispersion compensator driving circuit 33B generates a driving signal for driving the selected variable dispersion compensator in accordance with the controlling signal from the monitoring and controlling circuit 33A while receiving a power supplied from a power circuit 33D, and outputs the driving signal to the switching circuit 33C. The switching circuit 33C sends the driving signal from the dispersion compensator driving circuit 33B to the corresponding variable dispersion compensator, in accordance with the Ch selection signal. Here, the power from the power circuit 33D is also utilized for driving the monitoring and controlling circuit 33A and the switching circuit 33C. In the exemplary constitution of FIG. 18, the driving circuit and the power circuit are shared for the variable dispersion compensator $32_1$ to $32_n$. However, it is possible to provide individual driving circuits and power circuits for the variable dispersion compensator $32_1$ to $32_n$, respectively, similarly to the cases shown in FIGS. 12 and 13.

In the aforementioned optical transmission system, the wavelength dispersion values of variable dispersion compensator $32_1$ to $32_n$ are set combinedly with the dispersion compensating amounts by the variable dispersion compensators $10_1$ to $10_n$ at the optical receiver OR side, so that degradation of each optical signal waveform is minimized. The wavelength dispersion values of variable dispersion compensator $32_1$ to $32_n$ are set in accordance with the dispersion compensator controlling information provided from the exterior or occasionally controlled corresponding to the dispersion compensating state at the receipt side, in accordance with the dispersion compensator controlling information sent from the optical receiver OR.

In this way, according to the third embodiment, degradations of optical signal waveforms due to wavelength dispersion and polarization mode dispersion can be compensated for not only at the optical receiver OR side but also at the optical sender OS side, thereby enabling dispersion compensation over a wider range.

In the aforementioned optical transmission system of the third embodiment, the controlling circuit and the power circuit are shared so as to correspond to the variable dispersion compensator $32_1$ to $32_n$. However, it is possible to provide a controlling circuit and a power circuit for each of the variable dispersion compensator $32_1$ to $32_n$, similarly to the cases of FIG. 14 and FIG. 15. Further, in this embodiment, the system constitution has been such that WDM optical signal is transmitted. However, it is possible to provide a variable dispersion compensator at an optical sender side in a system for transmitting an optical signal having a single wavelength like the optical transmission system of the first embodiment.

There will be described hereinafter an optical transmission system according to a fourth embodiment of the present invention.

Figure 19:
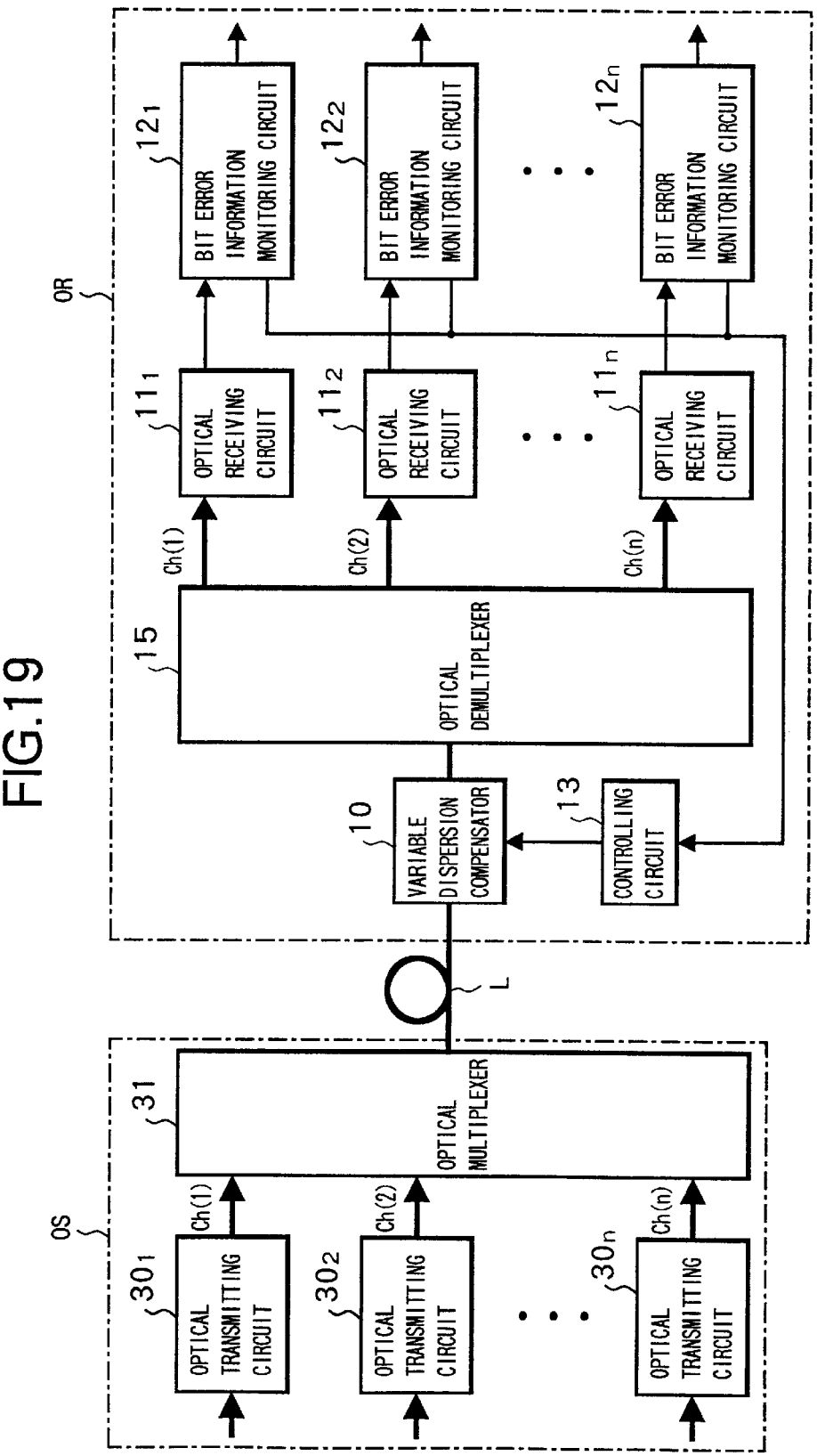
FIG. 19 is a block diagram showing a constitution of an optical transmission system according to a fourth embodiment of the present invention.

FIG. 19 is a block diagram showing a constitution of an optical transmission system according to the fourth embodiment of the present invention.

In FIG. 19, this optical transmission system is constituted such that, at an optical receiver OR side, a variable dispersion compensator 10 for collectively conducting dispersion compensation of a plurality of channel lights Ch(1) to Ch(n) is provided, in a WDM optical transmission system in which WDM optical signal including the channel lights Ch(1) to Ch(n) is transmitted from an optical sender OS to the optical receiver OR via an optical transmission path L. The wavelength dispersion value of the variable dispersion compensator 10 is to be controlled by a controlling circuit 13 based on the pieces of bit error information corresponding to the channel lights Ch(1) to Ch(n), respectively.

The variable dispersion compensator 10 is a known optical device, which is inserted, for example, at a preceding stage of an optical demultiplexer 15 to be able to collectively compensate for wavelength dispersion of WDM optical signal to be input into the optical receiver OR. Specifically, it is possible to adopt the aforementioned VIPA device or an optical device utilizing FBG, as the variable dispersion compensator 10.

The controlling circuit 13 obtains a sum of bit errors in all of the channel lights Ch(1) to Ch(n), based on the respective pieces of bit error information from bit error information monitoring circuits $12_1$ to $12_n$ corresponding to the channel lights Ch(1) to Ch(n), respectively, to optimally control the wavelength dispersion value of the variable dispersion compensator 10, so that the value of the sum of bit errors is becomes smaller. The concrete controlling method of the wavelength dispersion value of variable dispersion compensator 10 can be considered to be same as the aforementioned controlling method for wavelength dispersion of variable dispersion compensators individually corresponding to respective channel lights.

According to the aforementioned optical transmission system of the fourth embodiment, the dispersion compensation of WDM optical signal is collectively conducted by utilizing the single variable dispersion compensator 10, to thereby drastically reduce the number of variable dispersion compensators and the like, which have been provided corresponding to channel lights Ch(1) to Ch(n), respectively. Therefore, it is possible to achieve a reduced cost and downsizing of the optical receiver OR. Such a constitution to collectively conduct the dispersion compensation is particularly useful for wavelength dispersion compensation.

In the fourth embodiment, the controlling circuit 13 has obtained the sum of bit errors of all of the channel lights Ch(1) to Ch(n). However, the present invention is not limited thereto. For example, it is also possible to obtain a sum of bit errors of multiple channel lights previously set from among the channel lights Ch(1) to Ch(n), to control the variable dispersion compensator 10 based on such a sum. As the multiple channel lights to be previously set, it is possible to assumingly set, at a designing stage, those channel lights susceptible to degradation of signal waveforms (such as the channel lights at opposite ends of a signal light band) with respect to the collective compensation by the variable dispersion compensator 10. Further, it is also possible to specify the channel light most susceptible to degradation of a signal waveform from among the channel lights Ch(1) to Ch(n), to control the wavelength dispersion value of the variable dispersion compensator 10 based on bit errors of the specified channel light.

There will be now described an optical transmission system according to a fifth embodiment of the present invention.

Figure 20:
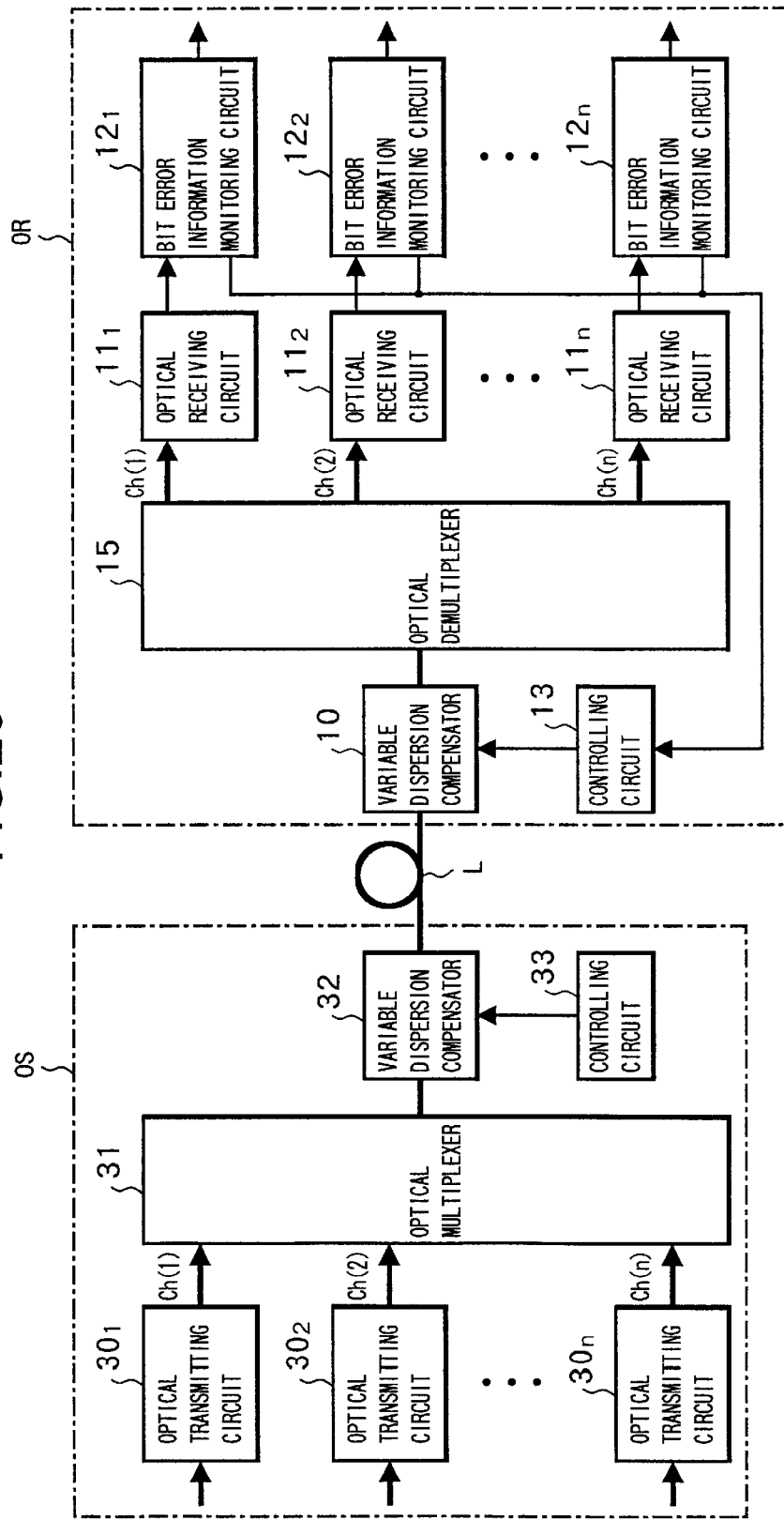
FIG. 20 is a block diagram showing a constitution of an optical transmission system according to a fifth embodiment of the present invention.

FIG. 20 is a block diagram showing a constitution of an optical transmission system according to the fifth embodiment of the present invention.

In FIG. 20, this optical transmission system is constituted such that, in the system constitution of the fourth embodiment shown in FIG. 19, a variable dispersion compensator 32 for collectively conducting the dispersion compensation of the channel lights Ch(1) to Ch(n) and a controlling circuit 33 for controlling the wavelength dispersion value of the variable dispersion compensator 32 are provided at the optical sender OS side. The constitution of the optical sender OS other than those described above; and the constitutions of the optical receiver OR and the optical transmission path L are identical with the fourth embodiment.

Similarly to the variable dispersion compensator 10 at the optical receiver OR side, the variable dispersion compensator 32 provided at the optical sender OS side is a known optical device capable of collectively compensating for wavelength dispersion of input WDM optical signal, and may concretely include such as a VIPA device, or an optical device utilizing FBG. Here, the variable dispersion compensator 32 is inserted at a succeeding stage of an optical multiplexer 31.

The controlling circuit 33 controls, for example, the wavelength dispersion value of the variable dispersion compensator 32 by a provisioning setting. According to the provisioning setting, the wavelength dispersion value of the variable dispersion compensator 32 is optimally controlled only at initial setting, and is set at a constant value without conducting a variable control during the operation of the system.

According to the fifth embodiment, degradation of optical signal waveform due to dispersion of the optical transmission path L is collectively compensated for not only at the optical receiver OR side but also at the optical sender OS side, thereby enabling dispersion compensation over a wider range and also realizing a reduced cost and downsizing of the optical sender OS.

Figure 21:
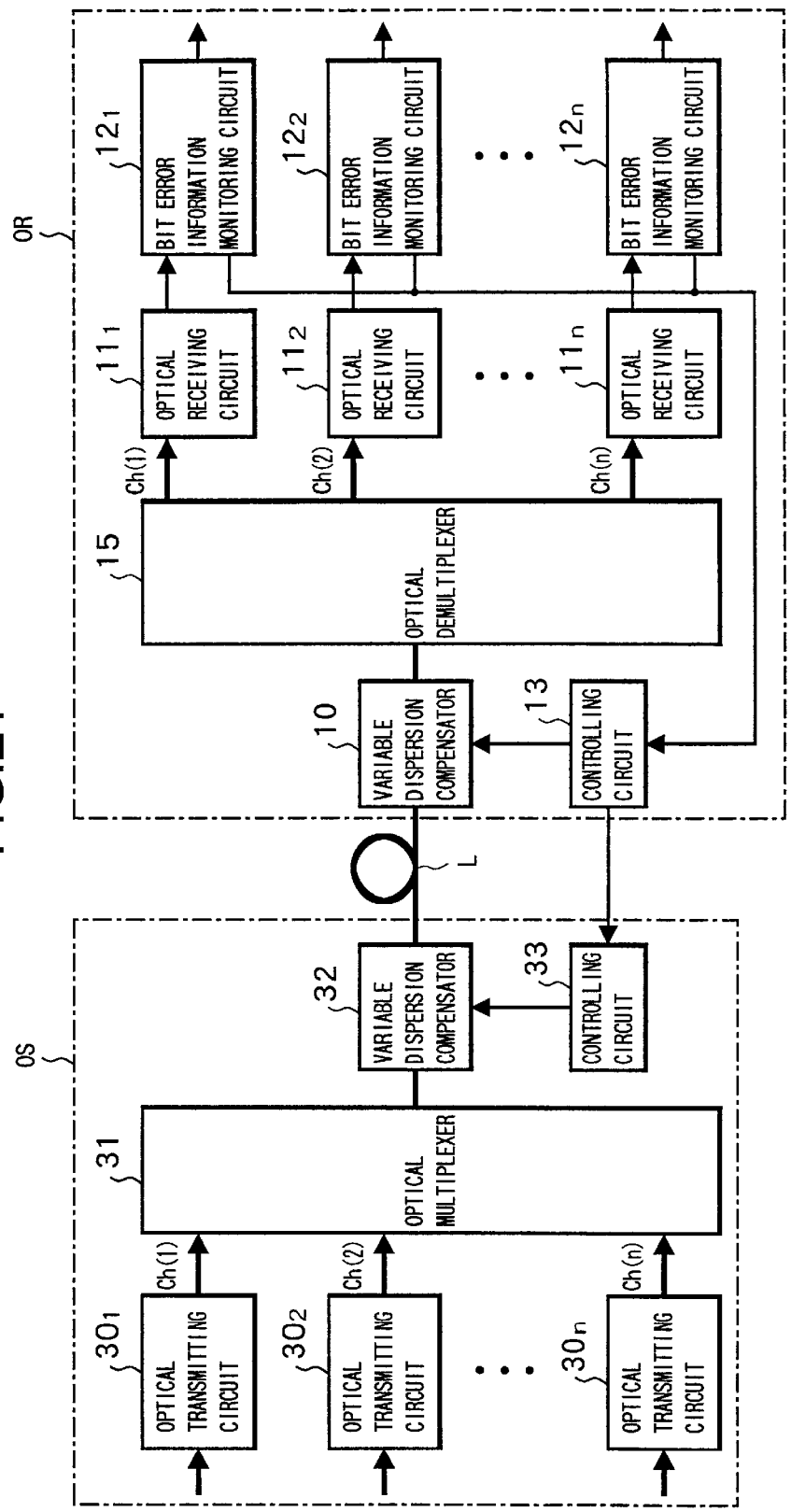
FIG. 21 is a view showing an exemplary constitution in a case where a variable dispersion compensator at a transmitting side is also automatically controlled, concerning the optical transmission system of the fifth embodiment.

In the aforementioned fifth embodiment, the controlling circuit 33 at the optical sender OS side has controlled the wavelength dispersion value of the variable dispersion compensator 32 by the provisioning setting. However, the present invention is not limited thereto. For example, as shown in FIG. 21, it is possible to send dispersion compensator controlling information from the controlling circuit 13 at the optical receiver OR side to the controlling circuit 33 at the optical sender OS side, to thereby automatically control the variable dispersion compensator 32 at the transmitting side. In this case, for the automatic controlling method of the variable dispersion compensator 32 at the transmitting side, there may be considered: a method to optimally control the wavelength dispersion value of the variable dispersion compensator 32 at the transmitting side only when the bit error rate is not sufficiently reduced only by the optimizing control of the variable dispersion compensator 10 at the receipt side; or a method to optimally control the wavelength dispersion value of the variable dispersion compensator 32 at the transmitting side as well as the receipt side, at initial setting and during service operation, based on the bit error information to be monitored at the optical receiver OR side.

What claimed is:

1. An apparatus comprising:
    means for dispersion compensating an optical signal by a compensation amount, to thereby produce a compensated optical signal;
    means for generating bit error information of the compensated optical signal; and
    means for simultaneously compensating for wavelength dispersion of the optical signal and polarization mode dispersion of the optical signal by controlling the compensation amount based on the generated bit error information so that bit errors of the optical signal indicated by the generated bit error information are reduced.

2. A dispersion compensating method for compensating for waveform degradation of optical signal caused by a wavelength dispersion characteristic of an optical transmission path, comprising the steps of:
    compensating a compensation amount for waveform degradation of optical signal by changing optical characteristics of an optical signal input via the optical transmission path;
    generating bit error information of said optical signal the waveform degradation of which has been compensated for; and
    controlling the compensation amount in said step of compensating for waveform degradation, based on said generated bit error information, so that the bit errors of said optical signal are reduced,
    wherein said step of compensating for waveform degradation compensates for the wavelength dispersion of the optical signal making use of a variable dispersion compensator, to thereby simultaneously compensate for the polarization mode dispersion of the optical signal corresponding to a pulse forming effect due to an interaction between said wavelength dispersion and a chirping the optical signal.

3. A dispersion compensating method according to claim 2,
    wherein said step of generating bit error information detects a bit error rate of said optical signal the waveform degradation of which has been compensated for.

4. A dispersion compensating method according to claim 2,
    wherein an error-correcting code is applied to said optical signal input via the optical transmission path, and
    said step of generating bit error information generates information concerning bit errors before error correction processing to be executed by an error-correcting circuit, for said optical signal the waveform degradation of which has been compensated for.

5. A dispersion compensating method according to claim 2,
    wherein an error-correcting code is applied to said optical signal input via the optical transmission path, and said step of generating bit error information detects the number of bit errors at error correction processing to be executed by an error-correcting circuit, for said optical signal the waveform degradation of which has been compensated for.

6. A dispersion compensating method according to claim 2, wherein said step of controlling the compensation amount sweeps, at initial setting, said compensation amount of the waveform degradation over a preset range, to thereby set said compensation amount of the waveform degradation to a point where the bit errors judged on the basis of said bit error information become the minimum; and sequentially varies, during service operation, said compensation amount of the waveform degradation in a direction of reducing the bit errors at intervals of a preset step width when said bit errors judged on the basis of said bit error information have exceeded a preset threshold, to thereby reset said compensation amount of the waveform degradation to a point where said bit errors become the minimum.

7. A dispersion compensating method according to claim 6, wherein said step of generating bit error information detects bit errors at preset measuring periods; and said step of controlling compensation amount, during service operation, judges a bit error rate based on the number of detected bit errors within one measuring period of time to thereby control said compensation amount of the waveform degradation, in a situation where said detected bit errors are relatively numerous, and judges a bit error rate based on the number of measuring periods required until the detection of a predetermined number of bit errors to thereby control said compensation amount of the waveform degradation, in a situation where said detected bit errors are relatively less.

8. A dispersion compensating method according to claim 2, wherein when said optical signal input via the optical transmission path is a wavelength division multiplexed optical signal including a plurality of channel lights having different wavelengths from one another, said compensation of the waveform degradation and said control of the compensation amount are conducted so as to correspond to each of the channel lights.

9. A dispersion compensating method according to claim 2, wherein when said optical signal input via the optical transmission path is a wavelength division multiplexed optical signal including a plurality of channel lights having different wavelengths from one another, said compensation of the waveform degradation and said control of the compensation amount are collectively conducted for said plurality of channel lights.

10. A dispersion compensating method according to claim 9, wherein said step of controlling compensation amount controls the compensation amount in said step of compensating for waveform degradation, based on a sum of bit errors of all of said plurality of channel lights.

11. A dispersion compensating method according to claim 9, wherein said step of controlling compensation amount controls the compensation amount in said step of compensating for waveform degradation, based on a sum of bit errors of at least two of said plurality of channel lights.

12. A dispersion compensating method according to claim 9, wherein said step of controlling compensation amount controls the compensation amount in said step of compensating for waveform degradation, based on bit errors of one of said plurality of channel lights.

13. A dispersion compensating method according to claim 9, wherein an error-correcting code is applied to said optical signal input via the optical transmission path, and said step of generating bit error information generates, for said optical signal the waveform degradation of which has been compensated for, either information concerning bit errors before error correction processing to be executed by an error-correcting circuit, or the number of bit errors at error correction processing to be executed by an error-correcting circuit.

14. A dispersion compensating apparatus comprising:

a waveform degradation compensating section compensating compensation amount for waveform degradation of optical signal by changing optical characteristics of an optical signal input via the optical transmission path;

a bit error information generating section generating bit error information of said optical signal the waveform degradation of which has been compensated for at said waveform degradation compensating section; and a controlling section controlling the compensation amount in said waveform degradation compensating section, based on the bit error information generated at said bit error information generating section, so that the bit errors of said optical signal are reduced, wherein said waveform degradation compensating section compensates for the wavelength dispersion of the optical signal making use of a variable dispersion compensator, to thereby simultaneously compensate for the polarization mode dispersion of the optical signal corresponding to a pulse forming effect due to an interaction between said wavelength dispersion and a chirping previously given to the optical signal.

15. A dispersion compensating apparatus according to claim 14, wherein an error-correcting code is applied to said optical signal input via the optical transmission path, and said bit error information generating section detects the number of bit errors at error correction processing to be executed by an error-correcting circuit, for said optical signal the waveform degradation of which has been compensated for at said waveform degradation compensating section, to send the detection result to said controlling section.

16. A dispersion compensating apparatus according to claim 14, wherein said variable dispersion compensator includes a VIPA (Virtually-Imaged-Phased-Array) device.

17. A dispersion compensating apparatus according to claim 14, wherein said variable dispersion compensator includes an FBG (Fiber-Bragg-Grating).

18. A dispersion compensating apparatus according to claim 14, wherein said bit error information generating section detects a bit error rate of said optical signal the waveform degradation of which has been compensated for at said waveform degradation compensating section.

19. A dispersion compensating apparatus according to claim 14,
wherein an error-correcting code is applied to said optical signal input via the optical transmission path, and
said bit error information generating section generates information concerning bit errors before error correction processing to be executed by an error-correcting circuit, for said optical signal the waveform degradation of which has been compensated for at said waveform degradation compensating section.

20. A dispersion compensating apparatus according to claim 14,
wherein said controlling section sweeps, at initial setting, said compensation amount in said waveform degradation compensating section over a preset range, to thereby set the compensation amount in said waveform degradation compensating section to a point where the bit errors judged on the basis of the bit error information from said bit error information generating section become the minimum; and sequentially varies, during service operation, the compensation amount in said waveform degradation compensating section in a direction of reducing said bit errors at intervals of a preset step width when the bit errors judged on the basis of the bit error information from said bit error information generating section have exceeded a preset threshold, to thereby reset the compensation amount in said waveform degradation compensating section to a point where said bit errors become the minimum.

21. A dispersion compensating apparatus according to claim 20,
wherein when said bit error information generating section detects bit errors at preset measuring periods to send the detection result to said controlling section,
said controlling section, during service operation, judges a bit error rate based on the number of detected bit errors within one measuring period of time to thereby control the compensation amount in said waveform degradation compensating section, in a situation where the detected bit errors detected by said bit error information generating section are relatively numerous, and judges a bit error rate based on the number of measuring periods required until the detection of a predetermined number of bit errors to thereby control the compensation amount in said waveform degradation compensating section, in a situation where the detected bit errors detected by said bit error information generating section are relatively less.

22. A dispersion compensating apparatus according to claim 14,
wherein when said optical signal input via the optical transmission path is a wavelength division multiplexed optical signal including a plurality of channel lights having different wavelengths from one another,
said dispersion compensating apparatus further comprises: a demultiplexing section for demultiplexing said wavelength division multiplexed optical signal into channel lights corresponding to the respective wavelengths, and a plurality of said waveform degradation compensating sections, a plurality of said bit error information generating sections and a plurality of said controlling sections are provided so as to correspond to each of the channel lights, so that the channel lights demultiplexed by said demultiplexing section are input into corresponding waveform degradation compensating sections, respectively.

23. A dispersion compensating apparatus according to claim 22,
wherein said plurality of controlling sections provided so as to correspond to said respective channel lights are shared for each group corresponding to at least two or more of the channel lights.

24. A dispersion compensating apparatus according to claim 23,
wherein each of said shared controlling sections includes a power circuit for the respective waveform degradation compensating sections corresponding to applicable channel lights.

25. A dispersion compensating apparatus according to claim 23,
wherein each of said shared controlling sections includes a driving circuit for driving the respective waveform degradation compensating sections corresponding to applicable channel lights.

26. A dispersion compensating apparatus according to claim 23,
wherein each of said plurality of waveform degradation compensating sections provided so as to correspond to said respective channel lights includes a driving circuit and an auxiliary power circuit for stand-by control, and
each of said shared controlling sections includes a main power circuit for setting-change control of the respective waveform degradation compensating sections corresponding to applicable channel lights.

27. A dispersion compensating apparatus according to claim 23,
wherein each of said shared controlling sections collectively monitors those pieces of bit error information sent from the respective bit error information generating sections corresponding to applicable channel lights, and selectively drives the waveform degradation compensating sections corresponding to applicable channel lights based on the monitoring result to thereby control the compensation amounts of the thus driven waveform degradation compensating sections, respectively.

28. A dispersion compensating apparatus according to claim 14,
wherein when said optical signal input via the optical transmission path is a wavelength division multiplexed optical signal including a plurality of channel lights having different wavelengths from one another,
said waveform degradation compensating section collectively compensates for said plurality of channel lights.

29. A dispersion compensating apparatus according to claim 28,
wherein said controlling section controls the compensation amount in said waveform degradation compensating section, based on a sum of bit errors of all of said plurality of channel lights.

30. A dispersion compensating apparatus according to claim 28,
wherein said controlling section controls the compensation amount in said waveform degradation compensating section, based on a sum of bit errors of at least two of said plurality of channel lights.

31. A dispersion compensating apparatus according to claim 28, wherein said controlling section controls the compensation amount in said waveform degradation compensating section, based on bit errors of one of said plurality of channel lights.

32. A dispersion compensating apparatus according to claim 28, wherein an error-correcting code is applied to said optical signal input via the optical transmission path, and said bit error information generating section generates, for said optical signal the waveform degradation of which has been compensated for, either information concerning bit errors before error correction processing to be executed by an error-correcting circuit, or the number of bit errors at error correction processing to be executed by an error-correcting circuit.

33. An optical transmission system for transmitting an optical signal sent from an optical sender to an optical receiver via an optical transmission path, wherein said optical receiver comprises a dispersion compensating apparatus of claim 14.

34. An optical transmission system according to claim 33, further comprising:

a variable dispersion compensator also provided at said optical sender side.

35. An optical transmission system according to claim 34, wherein said variable dispersion compensator at the optical sender side has a wavelength dispersion value controlled by provisioning setting.

36. An optical transmission system according to claim 34, wherein said variable dispersion compensator at the optical sender side has a wavelength dispersion value to be controlled when the waveform degradation compensation at the optical receiver side is insufficient.

37. An optical transmission system according to claim 34, wherein said variable dispersion compensator at the optical sender side has a wavelength dispersion value to be controlled based on bit error information to be generated by said optical receiver.

38. An optical transmission system according to claim 34, wherein said optical signal sent from said optical sender is a wavelength division multiplexed optical signal including a plurality of channel lights having different wavelengths from one another.

39. A method comprising:

dispersion compensating an optical signal by a compensation amount, to thereby produce a compensation optical signal;

generating bit error information of the compensated optical signal; and simultaneously compensating for wavelength dispersion of the optical signal and polarization mode dispersion of the optical signal by controlling the compensation amount based on the generated bit error information so that bit errors of the optical signal indicated by the generated bit error information are reduced.

40. A method as in claim 39, wherein said dispersion compensating uses a Virtually-Imaged-Phased-Array or an optical device using a Fiber-Bragg Rating to dispersion compensate by the compensation amount.

41. An apparatus comprising:

a variable dispersion compensator compensating dispersion an optical signal by a compensation amount, to thereby produce a compensated optical signal;

a bit error information generator generating bit error information of the compensated optical signal; and a controller simultaneously compensating for wavelength dispersion of the optical signal and polarization mode dispersion of the optical signal by controlling the compensation amount based on the generated bit error information so that bit errors of the optical signal indicated by the generated bit error information are reduced.

42. An apparatus as in claim 41, wherein the variable dispersion compensator is a Virtually-Imaged-Phased-Array or an optical device using a Fiber-Bragg Rating.

* * * * *

UNITED STATES PATENT AND TRADEMARK OFFICE
CERTIFICATE OF CORRECTION

PATENT NO.    : 6,871,024 B2
DATED         : March 22, 2005
INVENTOR(S)   : Hiroshi Nishimoto et al.

It is certified that error appears in the above-identified patent and that said Letters Patent is hereby corrected as shown below:

<u>Column 24,</u>
Line 8, delete "compensation" and insert -- compensated --.

Signed and Sealed this

Tenth Day of January, 2006

JON W. DUDAS
*Director of the United States Patent and Trademark Office*